US012810529B2

(12) United States Patent
Salvi et al.

(10) Patent No.: US 12,810,529 B2
(45) Date of Patent: Nov. 24, 2026

(54) DISPLACED MICROMESH COMPRESSION

(71) Applicant: NVIDIA Corporation, Santa Clara, CA (US)

(72) Inventors: Marco Salvi, Seattle, WA (US); Henry Moreton, Woodside, CA (US); Neil Bickford, Sunnyvale, CA (US); Gregory Muthler, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 583 days.

(21) Appl. No.: 17/946,563

(22) Filed: Sep. 16, 2022

(65) Prior Publication Data

US 2023/0078840 A1 Mar. 16, 2023

Related U.S. Application Data

(60) Provisional application No. 63/245,155, filed on Sep. 16, 2021.

(51) Int. Cl.
*G06T 15/06* (2011.01)
*G06T 1/60* (2006.01)
(Continued)

(52) U.S. Cl.
CPC ................ *G06T 15/06* (2013.01); *G06T 1/60* (2013.01); *G06T 9/001* (2013.01); *G06T 15/005* (2013.01);
(Continued)

(58) Field of Classification Search
CPC G06T 15/06; G06T 1/60; G06T 9/001; G06T 15/005; G06T 15/40; G06T 15/50; G06T 17/10; G06T 17/20; G06T 17/205; G06T 19/20; G06T 2210/08; G06T 2210/12; G06T 2210/21; G06T 2210/36; G06T 2219/2016
See application file for complete search history.

(56) References Cited

U.S. PATENT DOCUMENTS 6,184,897 B1 * 2/2001 Gueziec .................. G06T 17/20
345/440
6,504,537 B1 1/2003 Moreton et al.
(Continued)

OTHER PUBLICATIONS

Anteru, Storing vertex data: To interleave or not to interleave? URL: https://anteru.net/blog/2016/storing-vertex-data-to-interleave-or-not-to-interleave/ (Year: 2016).*
(Continued)

*Primary Examiner* — Phuc N Doan
(74) *Attorney, Agent, or Firm* — Nixon & Vanderhye P.C.

(57) ABSTRACT

An algorithm and associated set of rules enable a given polygon micro-mesh type to always be able to represent a more compressed micro-mesh type. These rules, in conjunction with additional constraints on the order used to encode displaced micro-meshes, enable lossy compression techniques to efficiently store geometric displacements as a parallel algorithm, with little communication required among independently compressed displaced micro-meshes, while guaranteeing high quality watertight (crack-free) results for vector displacements, triangle textures, and ray and path tracing.

21 Claims, 36 Drawing Sheets

| Base Triangle | | | With Maximum Displacement Blocks: Uncompressed 8x8 64B Format | | | | With Minimum Displacement Blocks: Compressed 32x32 64B Format | | | | Explicit Triangle Blocks (Peak Builder: 12 tris / block) | | |
|---|---|---|---|---|---|---|---|---|---|---|---|---|---|
| Level | Resolution | Micro Triangles | Displacement Blocks | Triangle Blocks | Memory footprint (Disp. Set + Tri Blocks) | Bits/ Micro Triangles | Displacement Blocks | Triangle Blocks | Memory footprint (Disp. Set + Tri Blocks) | Bits/ Micro Triangles | Triangle Blocks | Memory Footprint | Bits/ Triangle |
| 0 | 1 x 1 | 1 | 1 | 1 | 64 B + 128 B | 1,536.0 | 1 | 1 | 64 B + 128 B | 1,536.0 | 1 | 128 B | 1024 |
| 1 | 2 x 2 | 4 | 1 | 1 | 64 B + 128 B | 384.0 | 1 | 1 | 64 B + 128 B | 384.0 | 1 | 128 B | 256 |
| 2 | 4 x 4 | 16 | 1 | 1 | 64 B + 128 B | 96.0 | 1 | 1 | 64 B + 128 B | 96.0 | 2 | 256 B | 128 |
| 3 | 8 x 8 | 64 | 1 | 1 | 64 B + 128 B | 24.0 | 1 | 1 | 64 B + 128 B | 24.0 | 6 | 768 B | 96 |
| 4 | 16 x 16 | 256 | 4 | 1 | 256 B + 128 B | 12.0 | 1 | 1 | 64 B + 128 B | 6.0 | 22 | 3 KB | 88 |
| 5 | 32 x 32 | 1,024 | 16 | 1 | 1 KB + 128 B | 9.0 | 1 | 1 | 64 B + 128 B | 1.5 | 86 | 11 KB | 86 |
| 6 | 64 x 64 | 4,096 | 64 | 1 | 4 KB + 128 B | 8.3 | 4 | 1 | 256 B + 128 B | 0.8 | 342 | 43 KB | 85 |
| 7 | 128 x 128 | 16,384 | 256 | 4 | 16 KB + 512 B | 8.3 | 16 | 1 | 1 KB + 128 B | 0.6 | 1,366 | 171 KB | 85 |
| 8 | 256 x 256 | 65,536 | 1,024 | 16 | 64 KB + 2 KB | 8.3 | 64 | 1 | 4 KB + 128 B | 0.5 | 5,462 | 683 KB | 85 |
| 9 | 512 x 512 | 262,144 | 4,096 | 64 | 256 KB + 8 KB | 8.3 | 256 | 4 | 16 KB + 512 B | 0.5 | 21,846 | 3 MB | 85 |
| 10 | 1024 x 1024 | 1,048,576 | 16,384 | 256 | 1 MB + 32 KB | 8.3 | 1,024 | 16 | 64 KB + 2 KB | 0.5 | 87,382 | 11 MB | 85 |
| 11 | 2048 x 2048 | 4,194,304 | 65,536 | 1,024 | 4 MB + 128 KB | 8.3 | 4,096 | 64 | 256 KB + 8 KB | 0.5 | 349,526 | 43 MB | 85 |
| 12 | 4096 x 4096 | 16,777,216 | 262,144 | 4,096 | 16 MB + 512 KB | 8.3 | 16,384 | 256 | 1 MB + 32 KB | 0.5 | 1,398,102 | 171 MB | 85 |
| 13 | 8192 x 8192 | 67,108,864 | 1,048,576 | 16,384 | 64 MB + 2 MB | 8.3 | 65,536 | 1,024 | 4 MB + 128 KB | 0.5 | 5,592,406 | 683 MB | 85 |

(51) Int. Cl.

| | |
|---|---|
| ***G06T 9/00*** | (2006.01) |
| ***G06T 15/00*** | (2011.01) |
| ***G06T 15/40*** | (2011.01) |
| ***G06T 15/50*** | (2011.01) |
| ***G06T 17/10*** | (2006.01) |
| ***G06T 17/20*** | (2006.01) |
| ***G06T 19/20*** | (2011.01) |

(52) U.S. Cl.

CPC .............. *G06T 15/40* (2013.01); *G06T 15/50* (2013.01); *G06T 17/10* (2013.01); *G06T 17/20* (2013.01); *G06T 17/205* (2013.01); *G06T 19/20* (2013.01); *G06T 2210/08* (2013.01); *G06T 2210/12* (2013.01); *G06T 2210/21* (2013.01); *G06T 2210/36* (2013.01); *G06T 2219/2016* (2013.01)

(56) References Cited

U.S. PATENT DOCUMENTS

| | | | | |
|---|---|---|---|---|
| 6,597,356 | B1 | 7/2003 | Moreton et al. | |
| 6,738,062 | B1 | 5/2004 | Moreton | |
| 7,196,703 | B1 | 3/2007 | Moreton et al. | |
| 7,324,105 | B1 | 1/2008 | Moreton et al. | |
| 8,471,852 | B1 | 6/2013 | Bunnell | |
| 8,907,964 | B2 * | 12/2014 | Lee | G09G 5/363 345/557 |
| 10,909,739 | B2 | 2/2021 | Hakura et al. | |
| 11,270,507 | B1 * | 3/2022 | Lambert | G06T 5/73 |
| 2003/0093631 | A1 * | 5/2003 | Osborne | G06F 13/161 711/167 |
| 2008/0100617 | A1 * | 5/2008 | Keller | G06T 15/50 345/421 |
| 2008/0256300 | A1 * | 10/2008 | Lee | G06F 12/0875 375/372 |
| 2008/0316202 | A1 * | 12/2008 | Zhou | G06T 17/20 345/419 |
| 2011/0080405 | A1 | 4/2011 | Moreton | |
| 2011/0085736 | A1 | 4/2011 | Dmitriev et al. | |
| 2018/0096516 | A1 * | 4/2018 | Luebke | G06T 15/06 |
| 2019/0355167 | A1 * | 11/2019 | Nakao | G06F 17/11 |
| 2020/0051316 | A1 * | 2/2020 | Laine | G06T 15/06 |
| 2021/0201559 | A1 * | 7/2021 | Gruen | G06T 15/005 |
| 2021/0287431 | A1 * | 9/2021 | Woop | G06T 17/10 |
| 2022/0101483 | A1 * | 3/2022 | Riguer | G06T 17/10 |
| 2023/0017659 | A1 * | 1/2023 | Thonat | G06T 15/06 |

OTHER PUBLICATIONS

International Search Report and Written Opinion issued in PCT Application No. PCT/US2022/043800 mailed Mar. 13, 2023.

Jianping Ma et al., "Mobile 3D graphics compression for progressive transmission over wireless network", Computer-Aided Design and Computer Graphics, 11th IEEE International Conference, pp. 357-362, XP031528607, Aug. 19, 2009.

khronos.org/opengl/wiki/Tessellation#Tessellation_control_shader, last edited on Oct. 11, 2020.

Moreton, Tesselation and Geometry Shaders: Trends CMU 15-869 (Nvidia Corp. 2011).

Dudash, "My Tesselation Has Cracks!", Game Developer's Conference (2012).

Sfarti et al., "New 3D Graphics Rendering Engine Architecture for Direct Tessellation of Spline Surfaces", V.S. Sunderam et al. (Eds.): ICCS 2005, LNCS 3515, pp. 224-231 (2005).

N. Pietroni et al., "Almost Isometric Mesh Parameterization through Abstract Domains," IEEE Transactions on Visualization and Computer Graphics, vol. 16, No. 4, pp. 621-635, doi: 10.1109/TVCG.2009.96, Jul.-Aug. 2010.

Bunnell, Chapter 7. Adaptive Tessellation of Subdivision Surfaces with Displacement Mapping, GPU Gems 2 (NVidia 2005).

Thonat et al, Tessellation-free displacement mapping for ray tracing, pp. 1-16 ACM Transactions on Graphics vol. 40 Issue 6 No. 282, doi.org/10.1145/3478513.3480535, //dl.acm.org/doi/abs/10.1145/3478513.3480535, Dec. 2021.

Wang et al, View-dependent displacement mapping, ACM Transactions on Graphics vol. 22 Issue 3, pp. 334-339, doi.org/10.1145/882262.882272, Jul. 2003.

Lier et al, "A high-resolution compression scheme for ray tracing subdivision surfaces with displacement", Proceedings of the ACM on Computer Graphics and Interactive Techniques vol. 1 Issue 2, Article No. 33 pp. 1-17, doi.org/10.1145/3233308, Aug. 2018.

Chun et al, "Multiple layer displacement mapping with lossless image compression", International Conference on Technologies for E-Learning and Digital Entertainment Edutainment 2010: Entertainment for Education. Digital Techniques and Systems pp. 518-528, 2010.

Szirmay-Kalos et al, Displacement Mapping on the GPU-State of the Art, Computer Graphics Forum vol. 27, Issue 6, pp. 1567-1592, Sep. 2008.

Lee et al, "Displaced subdivision surfaces", SIGGRAPH '00: Proceedings of the 27th annual conference on Computer graphics and interactive techniques Jul. 2000 pp. 85-94 //doi.org/10.1145/344779.344829; Cantlay, "DirectX 11 Terrain Tesselation", Nvidia (Jan. 2011) (10 pages).

Doggett, "Displacement Mapping", ATI Research, Jan. 13, 2003, ResearchGate (14 pages).

Moreton et al, "Watertight Tessellation using Forward Differencing", EGGH01: SIGGRAPH/Eurographics Workshop on Graphics Hardware (2001) (8 pages).

Stein et al., "Developability of Triangle Meshes", ACM Trans. Graph., Aug. 2018, vol. 37, No. 4, Article 77 (14 pages).

Gurung et al., "SQuad: Compact Representation for Triangle Meshes", EuroGraphics, 2011, vol. 30, No. 2, The Eurographics Association and Blackwell Publishing Ltd. (10 pages).

* cited by examiner

| Base Triangle | | | With Maximum Displacement Blocks: Uncompressed 8x8 64B Format | | | | With Minimum Displacement Blocks: Compressed 32x32 64B Format | | | | Explicit Triangle Blocks (Peak Builder: 12 tris / block) | | |
|---|---|---|---|---|---|---|---|---|---|---|---|---|---|
| Level | Resolution | Micro Triangles | Displacement Blocks | Triangle Blocks | Memory footprint (Disp. Set + Tri Blocks) | Bits/ Micro Triangles | Displacement Blocks | Triangle Blocks | Memory footprint (Disp. Set + Tri Blocks) | Bits/ Micro Triangles | Triangle Blocks | Memory Footprint | Bits/ Triangle |
| 0 | 1 x 1 | 1 | 1 | 1 | 64 B + 128 B | 1,536.0 | 1 | 1 | 64 B + 128 B | 1,536.0 | 1 | 128 B | 1024 |
| 1 | 2 x 2 | 4 | 1 | 1 | 64 B + 128 B | 384.0 | 1 | 1 | 64 B + 128 B | 384.0 | 1 | 128 B | 256 |
| 2 | 4 x 4 | 16 | 1 | 1 | 64 B + 128 B | 96.0 | 1 | 1 | 64 B + 128 B | 96.0 | 2 | 256 B | 128 |
| 3 | 8 x 8 | 64 | 1 | 1 | 64 B + 128 B | 24.0 | 1 | 1 | 64 B + 128 B | 24.0 | 6 | 768 B | 96 |
| 4 | 16 x 16 | 256 | 4 | 1 | 256 B + 128 B | 12.0 | 1 | 1 | 64 B + 128 B | 6.0 | 22 | 3 KB | 88 |
| 5 | 32 x 32 | 1,024 | 16 | 1 | 1 KB + 128 B | 9.0 | 1 | 1 | 64 B + 128 B | 1.5 | 86 | 11 KB | 86 |
| 6 | 64 x 64 | 4,096 | 64 | 1 | 4 KB + 128 B | 8.3 | 4 | 1 | 256 B + 128 B | 0.8 | 342 | 43 KB | 85 |
| 7 | 128 x 128 | 16,384 | 256 | 4 | 16 KB + 512 B | 8.3 | 16 | 1 | 1 KB + 128 B | 0.6 | 1,366 | 171 KB | 85 |
| 8 | 256 x 256 | 65,536 | 1,024 | 16 | 64 KB + 2 KB | 8.3 | 64 | 1 | 4 KB + 128 B | 0.5 | 5,462 | 683 KB | 85 |
| 9 | 512 x 512 | 262,144 | 4,096 | 64 | 256 KB + 8 KB | 8.3 | 256 | 4 | 16 KB + 512 B | 0.5 | 21,846 | 3 MB | 85 |
| 10 | 1024 x 1024 | 1,048,576 | 16,384 | 256 | 1 MB + 32 KB | 8.3 | 1,024 | 16 | 64 KB + 2 KB | 0.5 | 87,382 | 11 MB | 85 |
| 11 | 2048 x 2048 | 4,194,304 | 65,536 | 1,024 | 4 MB + 128 KB | 8.3 | 4,096 | 64 | 256 KB + 8 KB | 0.5 | 349,526 | 43 MB | 85 |
| 12 | 4096 x 4096 | 16,777,216 | 262,144 | 4,096 | 16 MB + 512 KB | 8.3 | 16,384 | 256 | 1 MB + 32 KB | 0.5 | 1,398,102 | 171 MB | 85 |
| 13 | 8192 x 8192 | 67,108,864 | 1,048,576 | 16,384 | 64 MB + 2 MB | 8.3 | 65,536 | 1,024 | 4 MB + 128 KB | 0.5 | 5,592,406 | 683 MB | 85 |

FIG. 3

| Level: n | Resolution: $2^n \times 2^n$ | Micro Triangles: $4^n$ | uTri Index bits $\log_2(4^n)$ | Level Encoding bits: $\log_2(n+1)$ |
|---|---|---|---|---|
| 0 | 1 x 1 | 1 | 0 | 0 |
| 1 | 2 x 2 | 4 | 2 | 1 |
| 2 | 4 x 4 | 16 | 4 | 2 |
| 3 | 8 x 8 | 64 | 6 | 2 |
| 4 | 16 x 16 | 256 | 8 | 3 |
| 5 | 32 x 32 | 1,024 | 10 | 3 |
| 6 | 64 x 64 | 4,096 | 12 | 3 |
| 7 | 128 x 128 | 16,384 | 14 | 3 |
| 8 | 256 x 256 | 65,536 | 16 | 4 |
| 9 | 512 x 512 | 262,144 | 18 | 4 |
| 10 | 1024 x 1024 | 1,048,576 | 20 | 4 |
| 11 | 2048 x 2048 | 4,194,304 | 22 | 4 |
| 12 | 4096 x 4096 | 16,777,216 | 24 | 4 |
| 13 | 8192 x 8192 | 67,108,864 | 26 | 4 |
| 14 | 16384 x 16384 | 268,435,456 | 28 | 4 |
| 15 | 32768 x 32768 | 1,073,741,824 | 30 | 4 |
| 16 | 65536 x 65536 | 4,294,967,296 | 32 | 5 |

FIG. 4

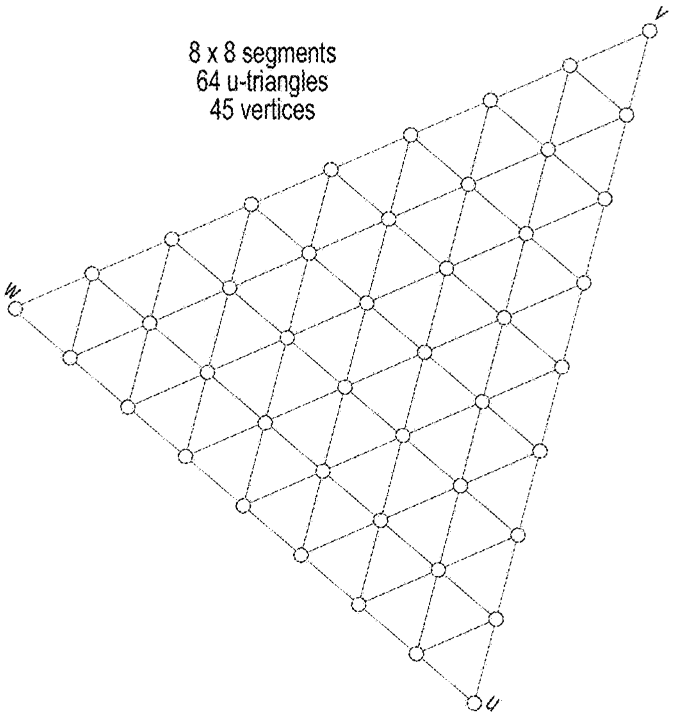

| byte | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | displacements | | | | | | | | | | | | | | | |
| 16 | ... | | | | | | | | | | | | | | | |
| 32 | ... | | | | | | | | | | | | | | | |
| 48 | ... | | | | | | | | | | | | | | rsv | |

| | | | | 64B (512b) | | |
|---|---|---|---|---|---|---|
| | | | | 8x8 = 64 utri | | |
| | Field | Description | Entries | Bit/Entry | Start | End |
| displacements | disp.w | Level 0 / Anchor displacement (vertex 0 / w) | 1 | 11 | 0 | 10 |
| \| | disp.u | Level 0 / Anchor displacement (vertex 1 / u) | 1 | 11 | 11 | 21 |
| \| | disp.v | Level 0 / Anchor displacement (vertex 2 / v) | 1 | 11 | 22 | 32 |
| v | disp.level1 | Level 1 displacements | 3 | 11 | 33 | 65 |
| | disp.level2 | Level 2 displacements | 9 | 11 | 66 | 164 |
| | disp.level3 | Level 3 displacements | 30 | 11 | 165 | 494 |

FIG. 6

Uncompressed block - Flat encoding - (64B)

Prismoid Convex Hull Model for Displaced Micromesh

Encoder

Decode Process

Compressed Displacement Block (1024b or 512b)

| byte | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | anchor | | | | corrections... | | | | | | | | | | | |
| 16 | ... | | | | | | | | | | | | | | | |
| 32 | ... | | | | | | | | | | | | | | | |
| 48 | ... | | | | | | | | | | | | | | | |
| 64 | ... | | | | | | | | | | | | | | | |
| 80 | ... | | | | | | | | | | | | | | | |
| 96 | ... | | | | | | | | | | | | | | | |
| 112 | ... | | | | | shifts | | | | | | | | | | |

| byte | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | anchor | | | | corrections... | | | | | | | | | | | |
| 16 | ... | | | | | | | | | | | | | | | |
| 32 | ... | | | | | | | | | | | | | | | |
| 48 | ... | | | | | shifts | | | | | | | | | | |

| | | | | 128B Displacement Block (1024b) | | | | | | 64B Displacement Block (512b) | | | | | |
|---|---|---|---|---|---|---|---|---|---|---|---|---|---|---|---|
| | | | | 8x8 = 64 utri | | | 16x16 = 256 utri | | | 32x32 = 1024 utri | | | 16x16 = 256 utri | | |
| | Field | Description | Entries | Bit/Entry | Start | End | Bit/Entry | Start | End | Bit/Entry | Start | End | Bit/Entry | Start | End |
| anchor | anchor.u | Anchor point for vertex u (unorm11) | 1 | 11 | 0 | 10 | 11 | 0 | 10 | 11 | 0 | 10 | 11 | 0 | 10 |
| | anchor.v | Anchor point for vertex v (unorm11) | 1 | 11 | 11 | 21 | 11 | 11 | 21 | 11 | 11 | 21 | 11 | 11 | 21 |
| | anchor.w | Anchor point for vertex w (unorm11) | 1 | 11 | 22 | 32 | 11 | 22 | 32 | 11 | 22 | 32 | 11 | 22 | 32 |
| corrections | correct.level1 | Corrections for level 1 | 3 | 11 | 33 | 65 | 11 | 33 | 65 | 11 | 33 | 65 | 11 | 33 | 65 |
| \| | correct.level2 | Corrections for level 2 | 9 | 8 | 66 | 137 | 11 | 66 | 164 | 8 | 66 | 137 | 8 | 66 | 137 |
| \| | correct.level3 | Corrections for level 3 | 30 | 4 | 138 | 257 | 10 | 165 | 464 | 4 | 138 | 257 | 4 | 138 | 257 |
| v | correct.level4 | Corrections for level 4 (>= 256 utri) | 108 | 2 | 258 | 473 | 5 | 465 | 1004 | 2 | 258 | 473 | 2 | 258 | 473 |
| | correct.level5 | Corrections for level 5 (1024 utri only) | 408 | 1 | 474 | 881 | | | | 0 | -- | -- | | | |
| empty space | | | | 90 | 882 | 971 | 3 | 1005 | 1007 | 2 | 474 | 475 | 2 | 474 | 475 |
| ^ | shift.level5 | Shift for level 5 | 4 | 4 | 972 | 987 | | | | | | | | | |
| \| | shift.level4 | Shift for level 4 | 4 | 4 | 988 | 1003 | 3 | 1008 | 1019 | 4 | 476 | 491 | 4 | 476 | 491 |
| \| | shift.level3 | Shift for level 3 | 4 | 3 | 1004 | 1015 | 1 | 1020 | 1023 | 3 | 492 | 503 | 3 | 492 | 503 |
| shifts | shift.level2 | Shift for level 2 | 4 | 2 | 1016 | 1023 | 0 | 1024 | 1023 | 2 | 504 | 511 | 2 | 504 | 511 |

FIG. 13

*Number range illustrating the correction problem case p=100, r=1900, s=0, b=7*

*Number range illustrating the correction problem case p=100, r=1900, s=6, b=3*

*An example distribution of differences between reference and predicted values mod 2048 for a particular sub-triangle, correction level, and vertex type. Since the differences cluster around 0 and 2047, utilizing wraparound behavior may allow for more precision here.*

*Choosing shifts that span the full range of possible differences without considering wrapping may result in large errors (distance between each red line and its closest green line).*

*Displacement differences wrapped to the range -1024...1023. The wrapped values cluster around 0, and their minimum and maximum give shifts such that the representable differences from shifted corrections (green) are closer to the differences, using the distance metric from $Z/2^{11}Z$ (though note that is not the metric ultimately used for correction), improving quality.*

```
foreach base triangle resolution (from lower to higher res):
    foreach micromesh type (from most to least compressed):
        foreach not encoded triangle:
            encode triangle
            if successful then mark triangle as encoded
        foreach partially encoded edge:
            update reference displacements
```

FIG. 21

```
foreach micromesh type:
    foreach not encoded triangle:
        encode triangle
        if successful then mark triangle as encoded
    foreach partially encoded edge:
        update reference displacements
```

FIG. 21A

DISPLACED MICROMESH COMPRESSION

CROSS-REFERENCE TO RELATED APPLICATIONS

This application claims priority to U.S. Provisional Patent Application No. 63/245,155 filed Sep. 16, 2021, the entire content of which is herein incorporated by reference.

This application is related to the following commonly-owned patent applications each of which is incorporated herein by reference for all purposes as if expressly set forth herein:

- U.S. patent application Ser. No. 17/946,235 filed Sep. 16, 2022 entitled Micro-Meshes, A Structured Geometry For Computer
- U.S. patent application Ser. No. 17/946,221 filed Sep. 16, 2022 entitled Accelerating Triangle Visibility Tests For Real-Time
- U.S. patent application Ser. No. 17/946,515 filed Sep. 16, 2022 entitled Displaced Micro-meshes for Ray and Path Tracing

FIELD

The present technology relates to compression of polygon mesh displacement data for computer graphics including but not limited to ray and path tracing. The technology herein provides a custom compression algorithm for generating high quality crack-free displaced micromeshes ("DMMs") for computer graphics, while being fast enough to handle dynamic content in modern real-time applications Still more particularly, the technology herein relates to a method for computing a compressed representation of dense triangle meshes such as for ray tracing workloads, and using lossy compression techniques to more efficiently store geometric displacements of polygon meshes such as for ray and path tracing while maintaining watertightness.

BACKGROUND & SUMMARY

As graphics rendering fidelity has increased and the graphics industry has made huge strides in how to model the behavior of light and its interactions with objects within virtual environments, there is now a huge demand for very detailed, more realistic virtual environments. This has meant a huge increase in the amount of geometry that developers would like to model and image. However, memory bandwidth remains a bottleneck that limits the amount of geometry that graphics hardware can obtain from memory for rendering.

In the past, tessellation shaders addressed the memory bandwidth problem by generating—on the fly—a polygon mesh (see FIGS. 1A, 1B) with no overlaps and no gaps between the geometric shapes or polygons, to cover a surface to be rasterized and rendered at a desired level of detail. See e.g., Lee et al, "Displaced subdivision surfaces", SIGGRAPH '00: Proceedings of the 27th annual conference on Computer graphics and interactive techniques July 2000 Pages 85-94 //doi.org/10.1145/344779.344829; Cantlay, "DirectX 11 Terrain Tesselation", Nvidia (January 2011); khronos.org/opengl/wiki/Tessellation#Tessellation_control_shader; Moreton et al, (2001); Moreton, Tesselation and Geometry Shaders: Trends CMU 15-869 (Nvidia Corp. 2011); U.S. Ser. No. 10/825,230; U.S. Pat. Nos. 9,437,042; 8,860,742; 8,698,802; 8,570,322; 8,558,833; 8,471,852; US 20110085736; U.S. Pat. Nos. 7,324,105; 7,196,703; 6,597,356; 6,738,062; 6,504,537; Dudash, "My Tesselation Has Cracks!", Game Developer's Conference (2012); Sfarti et al, "New 3D Graphics Rendering Engine Architecture for Direct Tessellation of Spline Surfaces", V. S. Sunderam et al. (Eds.): ICCS 2005, LNCS 3515, pp. 224-231 (2005); N. Pietroni et al, "Almost Isometric Mesh Parameterization through Abstract Domains," IEEE Transactions on Visualization and Computer Graphics, vol. 16, no. 4, pp. 621-635, July-August 2010, doi: 10.1109/TVCG.2009.96. A surface tessellator was implemented in hardware in the NVIDIA GeForce3 back in 2001, providing guaranteed watertight tessellation and varying level of detail (LOD) without any popping.

Such a tessellated mesh is said to be "watertight" when there are no gaps between polygons. The mesh is said to not be "watertight" if—pretending the mesh were a real object immersed in water—water would leak in through any seams or holes between geometric shapes or polygons forming the mesh. Even tiny gaps between polygons can lead to missing pixels that can be seen in a rendered image. See FIG. 2A for an example.

One source of such gaps resulted from performing floating-point operations in different orders—which did not always give the same results. Unfortunately, ordering shader calculations to make them identical for neighboring patches could cost a lot in performance. T-junctions—another watertight tessellation problem—occur when a patch is split even though one or more of its edges are flat. If the patch sharing the flat edges is not also split the same way, then a crack is created. See FIG. 2B; and see also Bunnell, Chapter 7. Adaptive Tessellation of Subdivision Surfaces with Displacement Mapping, GPU Gems 2 (NVidia 2005).

Cracks and pixel dropouts were thus known to result from differing levels of tessellation, from the formation of T-junctions, due to computation issues, and for other reasons. Because any practical system represents the location of any given vertex using finite precision, vertices do not (to the detailed calculation and processing hardware) always in fact precisely lie on adjoining segments between polygons. Although this problem may be exacerbated by the lower precision of some hardware rasterizers and other graphics hardware, it exists for any finite precision representation, including IEEE floating point.

Previous approaches often required solving a complex global optimization problem, in order to maximize quality without introducing cracks. But the only way to guarantee a flawless rendering is through precise representation of relationships; vertices that are logically equal must be exactly equal. See Moreton et al (2001). Furthermore, real-time graphics applications often need to compress newly generated data on a per frame basis (e.g., the output of a physics simulation), before it can be rendered. Thus, to satisfy current graphics systems demands, one must be very careful while also being fast in processing what is analogous to a firehose of information.

Ray tracing performance scales nicely as geometric complexity increases, making it a good candidate for visualization of such more complex and realistic environments. As an example, it is possible using ray tracing to increase the amount of geometry modeling a scene by a factor of 100 and not incur much of a time performance penalty (for example, tracing time might double—but generally not increase by anything close to a hundredfold).

The problem: even though real time or close to real time processing of vast numbers of triangles is now practical, the acceleration data structures needed to support tracing such increased complexity geometry have the potential to grow in size linearly with the increased amount of geometry and could take an amount of time to build that similarly increases linearly with the amount of geometry. Complex 3D scenes composed of billions of triangles are onerous to store in memory and transfer into the rendering hardware. A goal is to make it possible to dramatically increase the amount of geometry while avoiding a proportional increase in the time it takes to build an acceleration data structure or the space it takes to store the acceleration data structure in memory.

Work to compress polygon meshes for ray and path tracing has been done in the past. See for example Thonat et al, Tessellation-free displacement mapping for ray tracing, pp 1-16 ACM Transactions on Graphics Volume 40 Issue 6 No.: 282 (December 2021) doi.org/10.1145/3478513.3480535, //dl.acm.org/doi/abs/10.1145/3478513.3480535; Wang et al, View-dependent displacement mapping, ACM Transactions on Graphics Volume 22 Issue 3 Jul. 2003 pp 334-339, doi.org/10.1145/882262.882272; Lier et al, "A high-resolution compression scheme for ray tracing subdivision surfaces with displacement", Proceedings of the ACM on Computer Graphics and Interactive Techniques Volume 1 Issue 2 Aug. 2018 Article No.: 33 pp 1-17, doi.org/10.1145/3233308; Chun et al, "Multiple layer displacement mapping with lossless image compression", International Conference on Technologies for E-Learning and Digital Entertainment Edutainment 2010: Entertainment for Education. Digital Techniques and Systems pp 518-528; Szirmay-Kalos et al, Displacement Mapping on the GPU—State of the Art, Computer Graphics Forum Volume 27, Issue 6 Sep. 2008 Pages 1567-1592.

However, there is much room for improving how to represent polygon meshes for applications including but not limited to ray and path tracing in more compact, compressed forms that achieve "watertightness". In particular, there are several reasons why consistent mesh generation and representation are not simple. As one example, forward differencing can suffer from round-off error when evaluating a long sequence of vertices of a tessellated mesh. This problem can sometimes be made worse if the compressor and decompressor use different computation hardware. Even if the implementations were identical, the same inputs with differing rounding modes might yield unequal results. Also, if different patches are processed independently, it is simply not possible to match things up as you go or clean up small discrepancies after the fact—rather, consistent triangle mesh representation, compression, decompression and processing should be accomplished from the beginning as a part of the design. It is important to realize that in order to have a guarantee of perfect watertight rendering there can be no errors or inconsistencies—not even a single bit. See Moreton et al, Watertight Tessellation using Forward Differencing, EGGH01: SIGGRAPH/Eurographics Workshop on Graphics Hardware (2001).

BRIEF DESCRIPTION OF THE DRAWINGS

FIG. 3 shows an example table showing bits per triangle.

FIG. 4 shows an example table showing example tessellation levels.

FIG. 6 shows an example uncompressed displacement block.

FIG. 13 shows an example detailed displacement block format.

FIGS. 21, 21A, 21B show example pseudocode.

DETAILED DESCRIPTION OF NON-LIMITING EMBODIMENTS

Figure 1A:
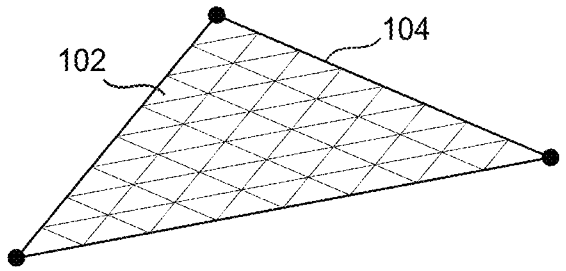
FIGS. 1A, 1B show example micromeshes.
Figure 1B:
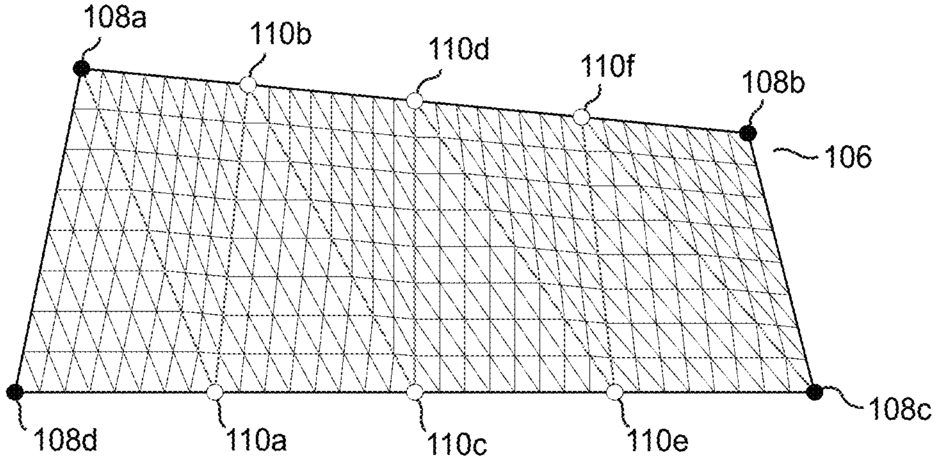

Embodiments herein employ a fast compression scheme that enables encoding sub triangles of a triangle mesh in parallel, with minimal synchronization, while producing high quality results that are free of cracks.

The introduction of Displaced Micro-meshes (DMMs) fills the aforementioned gap by helping to solve the memory bandwidth problem. See the micromesh patent applications. Very high quality, high-definition content is often very coherent, or locally similar. In order to achieve dramatically increased geometric quantities, we can use μ-mesh (also "micromesh")—a structured representation of geometry that exploits coherence for compactness (compression) and exploits its structure for efficient rendering with intrinsic level of detail (LOD) and animation. Micromesh is a powerful concept that has the ability to yield substantial speed and efficiency increases; for example, a huge advantage of micromesh tracing is the ability to rapidly and efficiently cull large portions of the mesh. The μ-mesh structure can for example be used to avoid large increases in bounding volume hierarchy (BVH) construction costs (time and space) while preserving high efficiency. When rasterizing, the intrinsic μ-mesh LOD can be used to rasterize right-sized primitives.

While applying displacement mapping to micromesh enables efficient rendering of highly complex 3D objects, as noted above, compressed numerical representations for the displacement map can create problems with "watertightness" if not implemented carefully. In particular, any lossy compression used to represent localized displacement map numerical representations has the potential to create cracks in the visualized/rendered micromesh if not handled appropriately.

Example embodiments herein provide a custom compression algorithm for generating high quality cracks-free displaced micromeshes ("DMMs"), while being fast enough to handle dynamic content in modern real-time applications. The technology herein succeeds in providing a crackfree micromesh in the form of a structured representation that enables it to be stored in very compact, compressed formats. In some example implementations, the average storage space per triangle is decreased from the typically ~100 bits per triangle to on the order of only 1 or 2 bits per triangle.

In one embodiment, such compression is achieved through a novel hierarchical encoding scheme using linearly interpolated vertex displacement amounts between minimum and maximum triangles forming a prismoid.

Furthermore, to satisfy the requirements above, we developed a fast compression scheme that enables encoding sub triangles in parallel, with minimal synchronization, while producing high quality results that are free of cracks.

In one embodiment, displacement amounts can be stored in a flat, uncompressed format such that, for example, an unsigned normalized value (such as UNORM11) for any microvertex can be directly accessed. Displacement amounts can also be stored in a new compression format that uses a predict-and-correct mechanism.

One embodiment of our compression algorithm constrains correction bit widths so the set of displacement values representable with a given μ-mesh type is a strict superset of all values representable with a more compressed μ-mesh type. By the encoder organizing the μ-mesh types from most to least compressed, we can proceed to directly encode sub triangles in "compression ratio order" using a predict-and-correct (P&C) scheme, starting with the most compressed μ-mesh type, until a desired level of quality is achieved. This scheme enables parallel encoding while maximizing compression ratio, and without introducing mismatching displacement values along edges shared between sub triangles.

Further aspects include determining what constraints need to be put in place to guarantee crack-free compression; a fast encoding algorithm for a single sub triangle using the prediction & correction scheme; a compression scheme for meshes that adopt a uniform tessellation rate (i.e., all base triangles contain the same number of μ-triangles); compressor extensions to handle adaptively tessellated triangle meshes; and techniques that exploit wraparound computation methods to increase compression performance.

One embodiment provides a set of rules on DMM correction and shift bit widths that enable a given micro-mesh type to always be able to represent a more compressed micro-mesh type. These rules, in conjunction with additional constraints on the order used to encode DMMs, enable a compression scheme as a parallel algorithm, with little communication required among independently compressed DMMs, and still being able to guarantee high quality crack free results. In one embodiment, the technology herein transforms a previously global optimization into a local one, enabling parallel crack-free compression of DMMs, with very little "inter-triangle" communication required at compression time.

When rendering using data from a compressed representation, we need to be able to efficiently access required data. When rendering a pixel, we can directly address associated texels by computing the memory address of the compressed block containing the required texel data. Texel compression schemes use fixed block size compression, which makes possible direct addressing of texel blocks. When compressing displacement maps (see below) in one embodiment, we use a hierarchy of fixed size blocks with compressed encodings therein.

Further novel features include:

- A robust constant-time algorithm for finding the closest possible correction. An algorithm is used to find the correction that makes decoded value as close to a reference value as possible. This turns out to be tricky, since the sign-extended and shifted correction is added to the prediction in the group of integers modulo 2048, but errors are computed (and appear visually) without wraparound.
- Improving shift value computation by utilizing wrapping. We can sometimes reduce the shifts needed and effectively get some extra bits of precision in blocks where corrections are clustered around 0.
- Using displacement ranges in the encoding success metric. We can assign each vertex an importance; regions with higher importance tend to use higher-quality formats, while regions with less importance tend to use lower-quality formats.

Crackfree Guarantee

Figure 2B:
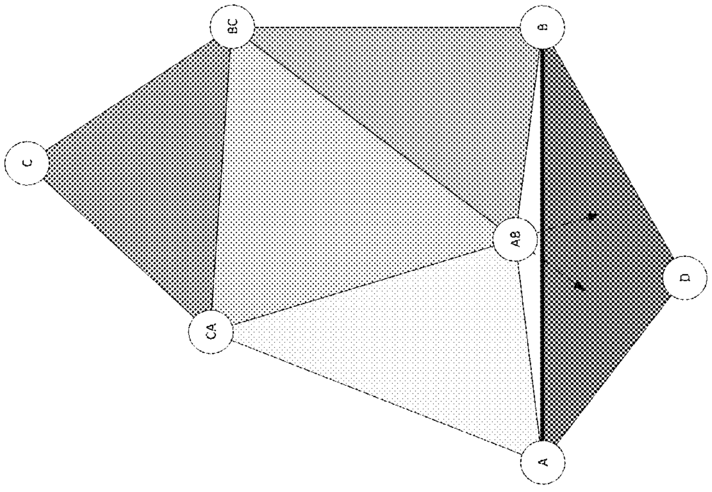
FIGS. 2A, 2B show example cracks in micromeshes.
Figure 2A:
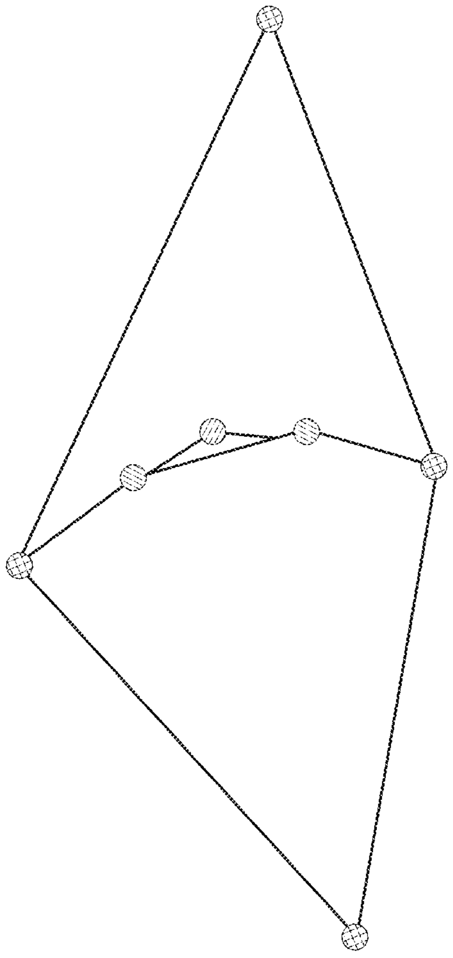

FIGS. 2A, 2B show example meshes that have developed cracks—visible seams between internal edges of the mesh. Vertices of adjacent triangles should be at the same shared position along a common edge, but sometimes they become offset so they are not at the same position. Two adjacent triangles are supposed to share an edge positionally, but the vertices of that edge have divergent data. Using conventional meshes, interior edges were usually guaranteed not to crack, but that is not necessarily the case when using displacement-mapped micromeshes. In such contexts, any edge between adjacent micromeshes could potentially crack.

An often-used general solution to cracking is to ensure the hardware or shader uses the same input data for shared vertices and shared edges. But displacement offsets or differences along shared edges have been known to pick up slightly different or varying values, which can lead to cracking artifacts. This can be especially true where the shared vertex/shared edge numerical values are accessed and determined locally/independently e.g., on a randomly ordered basis rather than together and/or in a particular order.

The example non-limiting embodiments herein provide crackfree, watertightness guarantees despite such challenges.

DMM Compression

When highly detailed geometry is described, it is important that the description be as compact as possible. The viability of detailed geometry for real-time computer graphics relies on being able to render directly from a compact representation. The above-referenced copending commonly-assigned "micromesh" patent applications describe the incorporation of displacement maps (DMs) into a μ-mesh representation. Because the DMs are high quality μ-mesh components, they may be compressed by taking advantage of inherent coherence. DMs can be thought of as representatives of data associated with vertices. This data class may be understood as calling for both lossless and lossy compression schemes. Where a lossless scheme can exactly represent an input, a lossy scheme is allowed to approximate an input to within a measured tolerance. The fact that a scheme is lossy means that data is being lost—which should make higher compression ratios and more compact data representations possible. However, as noted above, the problem is not (just) ensuring the decompressor recovers the compressed data in a deterministic way—it is further complicated by the need to recover the same (bit-for-bit) displacement values whenever the vertices are on a shared tessellated edge between two different polygons.

Lossy schemes may flag where an inexact encoding has occurred, or indicate which samples failed to encode losslessly.

Displacement Block Storage

In one embodiment, the mesh displacement information is stored in a number of different compressed formats that allow us to describe the microtriangles with as few bits as possible.

In one example embodiment, the micromesh comprises a mesh of base triangles that are stitched or joined together at their respective vertices. These base triangles can be referred to as "API" base triangles because they each define three vertices of the type that can be processed by a legacy vertex shader or ray tracer. However, in one embodiment, the base triangle itself is not imaged, rasterized or otherwise visualized, and instead serves as a platform for a recursively-subdividable displacement-mapped micromesh. This micromesh is formed as regular $2^n \times 2^n$ mesh (where n is any non-zero integer), with each further tessellated level subdividing each sub triangle in the previous level into four (4) smaller sub triangles according to a barycentric grid and a space filling curve. See FIG. 4 table. In this example, higher tessellation levels have more sub triangles defined within the base triangle and thus offer higher levels of detail. See FIG. 5.

In example embodiments, a displacement value is stored for each microvertex of the micromesh. These displacement values are stored in displacement blocks such as shown in FIG. 6. The displacement blocks in which the displacement values are stored are of a fixed size that depends on the graphic system memory subsystem and the memory block consumption size of the graphics hardware. For example, in one embodiment, all displacement values for all vertices of a sub triangle are configured to fit within a single cache line (e.g., in one example, a full cacheline is 128 bytes and a half cacheline is 64 bytes).

In one embodiment, because of the way the displacement values are configured, no compression is needed in order to fit displacement values for lower tessellation levels into a single cacheline. As FIG. 6 shows, lower tessellation levels are less compressed—and their displacement blocks may contain the full precision displacement value for each vertex. See summary table below:

| | |
|---|---|
| Base Triangle U Vertex Displacement | 11-bit UNORM |
| Base Triangle V Vertex Displacement | 11-bit UNORM |
| Base Triangle W Vertex Displacement | 11-bit UNORM |
| Level 1 Vertex Displacements | 3 additional 11-bit UNORMs |
| Level 2 Vertex Displacements | 9 additional 11-bit UNORMs |
| Level 3 Vertex Displacements | 30 additional 11-bit UNORMs |

See FIG. 6 example uncompressed displacement block. Note that this example displacement block holds all of the displacement values in the table above for recursive tessellation levels 0, 1, 2 and 3 in the space of ½ cacheline. Example embodiments store displacement values for multiple tessellation levels 0-3 simultaneously to allow real time hardware to cull sub triangles and select between different levels of detail "on the fly" without the need for additional memory storage or accesses.

"Full" Precision Displacement Values are Represented as UNORM11

Figure 7:
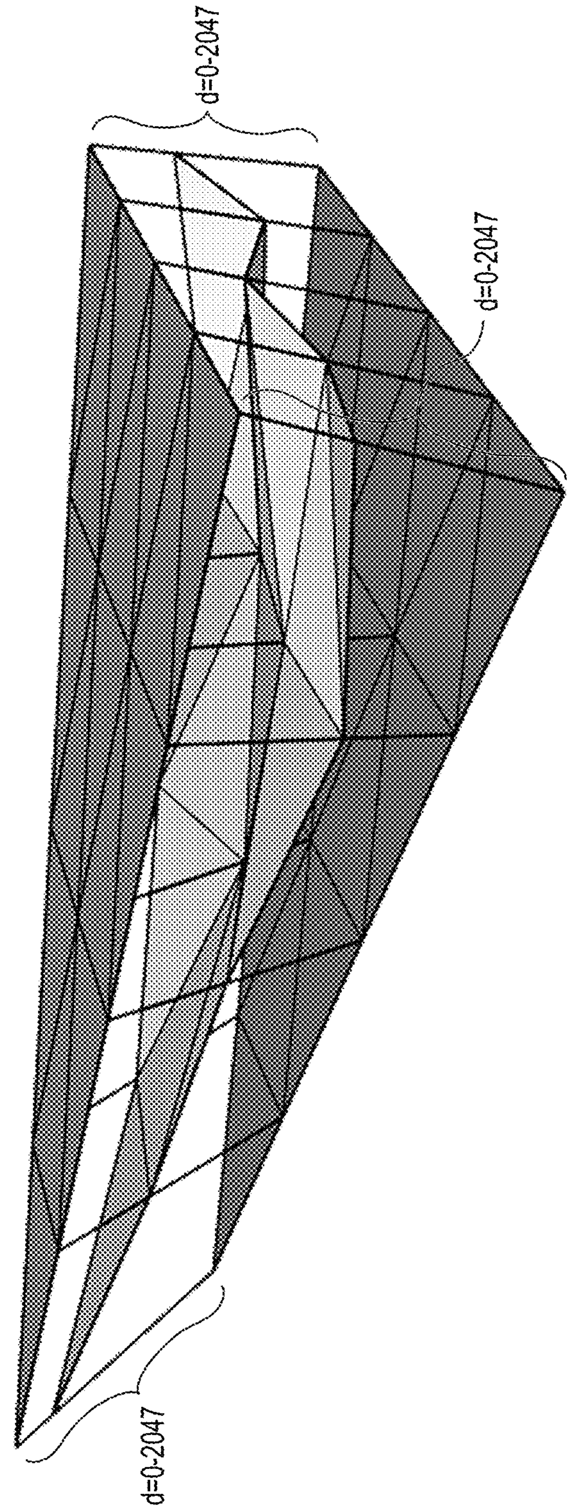
FIG. 7 shows an example prismoid convex hull model for a displaced micromesh.

For context, FIG. 7 is an example prismoid convex hull model that assigns to polygon mesh vertices, displacement values that are interpolated between maximum and minimum triangles using a 0-1 range (with bias and scaling applied across the entire base triangle's mesh e.g., to define the maximum triangle, the minimum triangle in one embodiment being defined as the planar surface of the base triangle, although the base triangle could be between the minimum and maximum triangle, outside them, or even intersecting the minimum and/or maximum triangle e.g. if the biases at different vertices have different signs). In one example, the range between the minimum and maximum triangles with an appropriate resolution can be defined using 11 bits—providing $2^{11}$ or 2048 incremental positions for linear interpolation and allowing a very compact unsigned normalized UNORM11 numerical representation. "UNORM" means that the values are unsigned integers that are converted into floating points. The maximum possible representable value becomes 1.0 and the minimum representable value becomes 0.0. For example, the binary value 2047 in a UNORM11 will be interpreted as 1.0. Other UNORMs or other numerical representations are also possible.

Thus, in example embodiments, displacement amounts can be stored in a flat, uncompressed format where the UNORM11 displacement for any μ-vertex can be directly accessed.

However, as the tessellation level increases, so do the number of microvertices and we soon run out of room in a single cacheline to store the corresponding displacement values in UNORM11. See FIG. 4 table. For higher tessellation levels, we use a compressed format that encodes and communicates a correction to a predicted value that a predictor circuit within the decoder can determine based on information it already has. Such displacement amounts can thus also be stored in a compression format that uses a predict-and-correct (P&C) mechanism.

Displacement Compression with Forward Differencing ("Predict-and-Correct")

The P&C mechanism in an example embodiment relies on the recursive subdivision process used to form a μ-mesh. A set of base anchor points are specified for the base triangle. At each level of subdivision, new vertex displacement values are formed by averaging the displacement values of two adjacent vertices in a higher subdivision level. This is the prediction step: predict that the value is the average of the two adjacent vertices.

The next step corrects that prediction by moving it up or down to get to where it should be. When those movements are small, or are allowed to be stored lossily, the number of bits used to correct the prediction can be smaller than the number of bits needed to directly encode it. The bit width of the correction factors is variable per level.

In more detail, for predict-and-correct, a set of base anchor displacements are specified for the base triangle as shown in FIG. 6. During each subdivision step to the next highest tessellation level, displacements amounts are predicted for each new microvertex by averaging the displacement amounts of the two adjacent (micro)vertices in the lower level. This prediction step predicts the displacement amount as the average of the two (previously received or previously calculated) adjacent displacement amounts:

disp_amount_prediction=(disp_amount_v0+disp_amount_v b1+1)/2

It will be noted that the encoder will communicate the base anchor displacements to the decoder, and the decoder in recursively subdividing the base triangle into increasingly deeper levels of subdivision (resulting in higher and higher tessellation levels) will already have calculated the adjacent microvertex displacement values which are thus available for computing (by linear interpolation) the displacement values for new intermediate microvertices.

Figure 8:
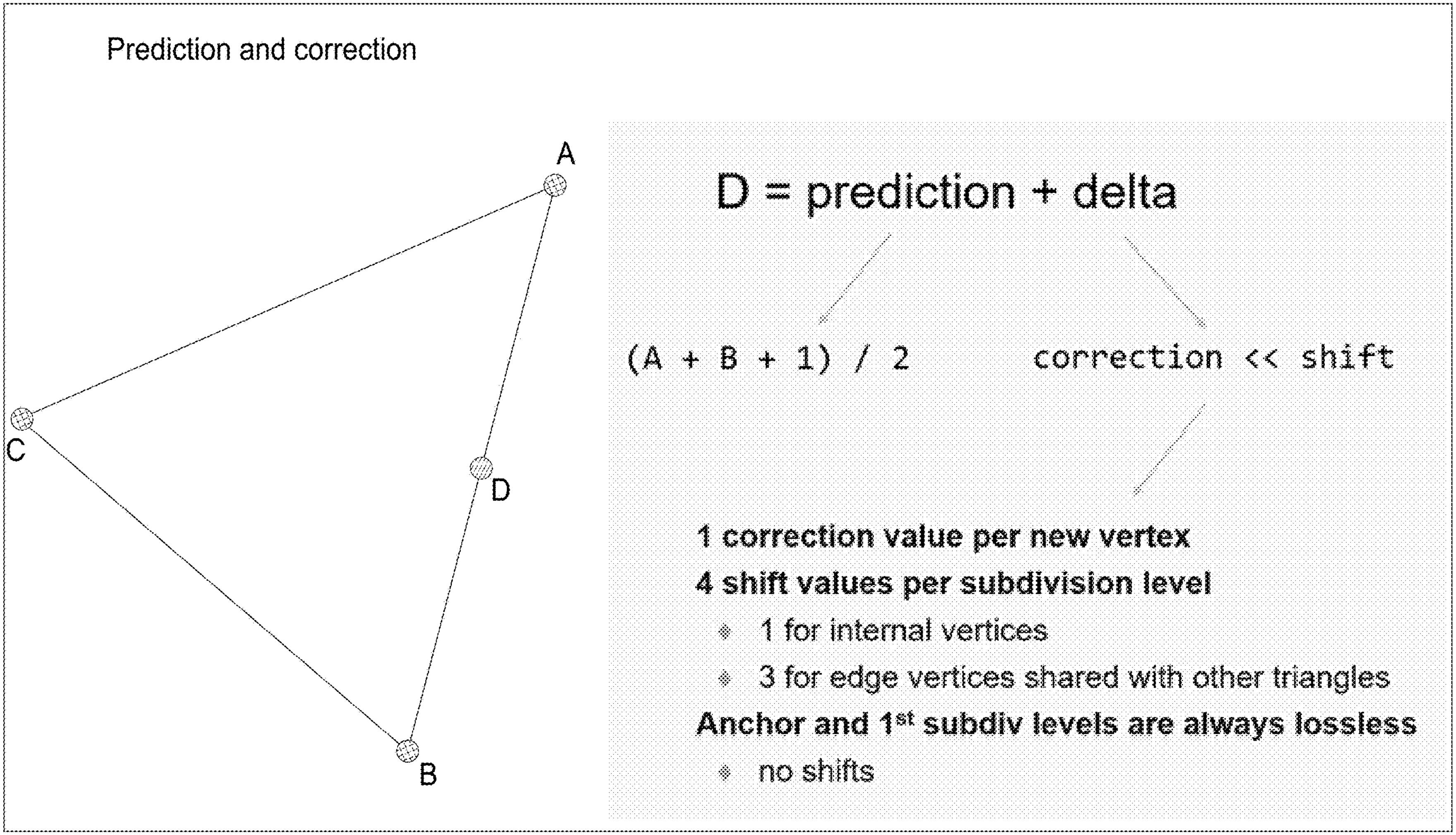
FIG. 8 shows an example summary for prediction and correction.
Figure 11:
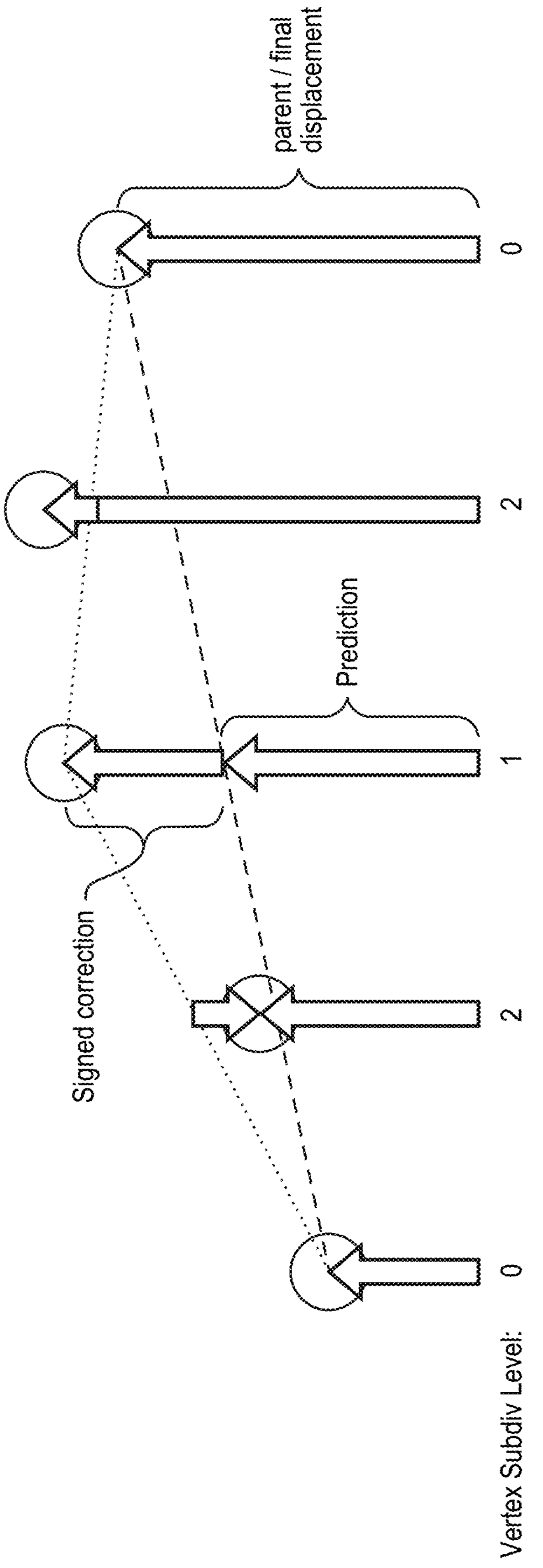
FIG. 11 shows an example application of signed corrections with tessellation level.

Of course, the actual displacement value of a microvertex is not necessarily the same as its immediate neighbors—the micromesh is configured in one embodiment so any microtriangle can have an independent orientation which means that its three microvertices can have independently defined displacement values. So as in a typical forward differencing system, the encoder also calculates and communicates to the decoder, a scalar correction to the prediction. In other words, the encoder computes the prediction and then compares the prediction to the actual displacement value of the microvertex. See FIGS. 8 & 9. From this comparison, the encoder determines a delta (difference) or "correction" that it communicates to the decoder. The decoder (see FIG. 10) independently calculates the prediction from the information it already has, and then applies the correction it receives from the encoder to adjust the value it predicted. In this case, referring to FIG. 10A, the displacement values for microtriangle vertices d(4) and d(7) are calculated respectively as:

$d(4)=(d(2)+d(1)+1)/2+\text{correction}(4)$ $d(7)=(d(5)+d(3)+1)/2+\text{correction}(7).$ Thus, the next step performed by both the encoder and the decoder is to correct the predicted displacement amount with a per-vertex scalar correction, moving the displacement amount up or down to reach the final displacement amount. When these movements are small, or allowed to be stored lossily, the number of bits used to correct the prediction can be smaller than the number of bits needed to directly encode it. In practice it is likely for higher subdivision levels to require smaller corrections due to self-similarity of the surface, and so the bit-widths of the correction factors are reduced for higher levels. See FIG. 11.

The base anchor displacements are unsigned (UNORM11) while the corrections are signed (two's complement). In one embodiment, a shift value is also introduced to allow corrections to be stored at less than the full width. Shift values are stored per subdivision level with 4 variants (a different shift value for the microvertices of each of the three sub triangle edges, and a fourth shift value for interior microvertices) to allow vertices on each of the sub triangle's edges to be shifted independently (e.g., using simple shift registers) from each other and from vertices internal to the sub triangle.

In more detail, at deeper and deeper tessellation levels, the micromesh surface tend to become more and more self-similar—permitting the encoder to use fewer and fewer bits to encode the signed correction between the actual surface and the predicted surface. The encoding scheme in one embodiment provides variable length coding for the signed correction. More encoding bits may be used for coarse corrections, fewer encoding bits are needed for finer corrections. In example embodiments, this variable length coding of correction values is tied to tessellation level as follows:

| Tessellation Level | Number of Corrections | Width of Corrections (bits) |
|---|---|---|
| 1 | 3 | 11 |
| 2 | 9 | 8 |
| 3 | 30 | 4 |
| 4 | 108 | 2 |
| 5 | 408 | 1 |

Thus, in one embodiment, when corrections for a great many microtriangles are being encoded, the number of correct bits per microtriangle can be small (e.g., as small as a single bit in one embodiment).

Meanwhile, in one embodiment, the encoding scheme uses block floating point, which allows even one bit precision to be placed wherever in the range it is needed or desired. Thus, "shift bits" allow adjustment of the amplitude of corrections, similar to a shared exponent. The shifts for the above tessellation levels may be as follows in one embodiment:

| Tessellation Level | Number of Shift Values | Width of Shift Values (bits) |
|---|---|---|
| 1 | 0 | |
| 2 | 4 | 2 |
| 3 | 4 | 3 |
| 4 | 4 | 4 |
| 5 | 4 | 4 |

The decoder (and the encoder when recovering displacement values it previously compressed) may use a hardware shift circuit such as a shift register to shift correction values by amounts and in directions specified by the shift values. For example, the level 5 4-bit shift values can shift the 1-bit correction value to any of 16 different shift positions to provide a relatively large dynamic range for the 1-bit correction value.

Providing different shifts for different levels and different shifts for each edge and interior vertices prevents "chain reactions" or domino-like effects (i.e., where knocking down one domino causes the momentum to propagate to a next domino, which propagates it to a further domino, and so on) and avoids the need for global optimization of the mesh. By decoupling the shift values used to encode/decode the interior vertices from the edge vertices, we enable the edge vertices to match their counterparts on neighboring micromeshes which share the same edges, without propagating the constraints on their values to the interior vertices. When this is not possible, such constraints can emerge locally and propagate throughout the mesh and effectively become global constraints. As will be explained below, the width of the shift and correction values cannot be arbitrary, but must follow constraints to ensure bit-for-bit matching between compression levels.

The predict-and-correct operation expressed in the following example Formula 1 below, written in pseudo-code:

```
disp_amount_prediction = (disp_amount_v0 + disp_amount_v1 + 1) / 2
```

-continued

```
disp_correction = signextend(correction) << shift[level][type]
disp_final = disp_amount_prediction + disp_correction
```

Each final displacement amount then becomes a source of prediction for the next level down. Note that each prediction has an extra "+1" term which allows for rounding versus truncation, since the division here is the correction's truncating division. It is equivalent to prediction=round((v0+v1)/2) in exact precision arithmetic, rounding half-integers up to the next whole number.

As will be understood from the discussion below, a primary design goal for this compression algorithm is to constrain the correction bit widths so that the set of displacement values representable with a given μ-mesh type is a strict superset of all values representable with a more compressed μ-mesh type. The above correction and shift value widths meet this constraint.

In another embodiment, the displacement map may be generated and encoded using the above described predict and control (P&C) technique and the constant-time algorithm for finding the closest correction is used. In an embodiment, as described above, the P&C technique and the algorithm for finding the closest correction is used in association with the fast compression scheme directed to constrain correction bit widths in displacement encodings.

Displacement Storage

Displacement amounts are stored in 64B or 128B granular blocks called displacement blocks. The collection of displacement blocks for a single base triangle is called a displacement block set. A displacement block encodes displacement amounts for either 8×8 (64), 16×16 (256), or 32×32 (1024) μ-triangles.

In a particular non-limiting implementation, the largest memory footprint displacement set will have uniform uncompressed displacement blocks covering 8×8 (64) μ-triangles in 64 bytes. The smallest memory footprint would come from uniformly compressed displacement blocks covering 32×32 in 64 bytes, which specifies ~0.5 bits per μ-triangle. There is roughly a factor of 16× difference between the two. The actual memory footprint achieved will fall somewhere within this range. The size of a displacement block in memory (64B or 128B) paired with the number of μ-triangles it can represent (64, 256 or 1024) defines a μ-mesh type. We can order μ-mesh types from most to least compressed, giving a "compression ratio order" used in watertight compression—see FIG. 5.

As the FIG. 3 table shows, plural uncompressed 8×8 (64B) displacement blocks per base triangle (or alternatively, the maximum possible number of displacement blocks for a given tessellation level) may be used for tessellation levels above level 3, as follows:

| Tessellation Level | Number of Displacement Blocks |
|---|---|
| 4 | 4 |
| 5 | 16 |
| 6 | 64 |
| 7 | 256 |
| 8 | 1024 |
| 9 | 4096 |
| 10 | 16384 |
| 11 | 65536 |
| 12 | 262144 |
| 13 | 1048576 |

While the number of displacement blocks in the above table increases geometrically with larger numbers of triangles, self-culling at the decoder/graphics generation side will often or usually (e.g., in ray tracing) ensure that only one or a small number of the displacement blocks is actually retrieved from memory.

Figure 12:
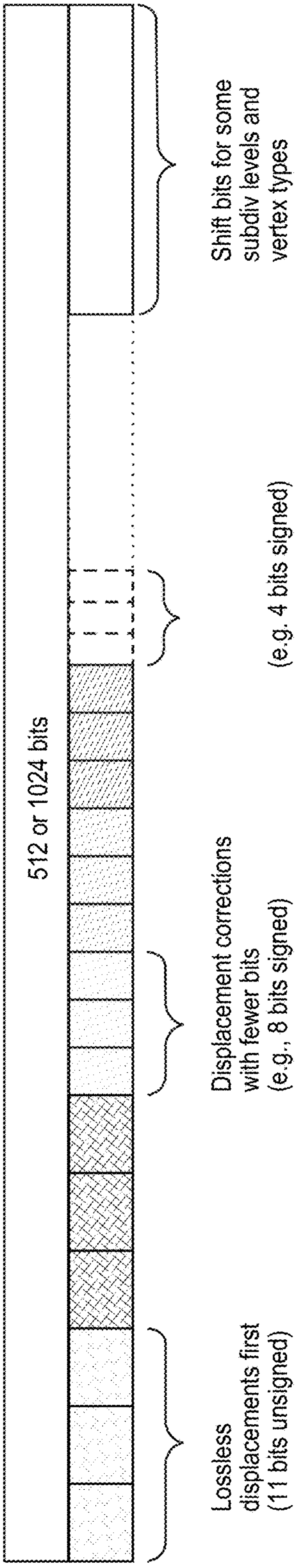
FIG. 12 shows an example generic displacement block format.

FIGS. 12 and 13 show example detailed compressed displacement block formats the encoder uses to communicate compressed displacement values to the decoder. As mentioned, in one embodiment, compressed displacement blocks can be either 64B or 128B in size, and are used for 16×16 or 32×32 sub triangles. These blocks specify the anchor displacements in UNORM11, per micro-vertex corrections for each subdivision level in two's complement, and four unsigned shift variants per level above subdivision level 1. Note that the bit widths for both corrections and shifts depend on the sub triangle resolution as well as the subdivision level. Furthermore, in one embodiment the microvertex displacement information for the same subdivision level can be encoded in more or less compressed formats (for example, in FIG. 13 compare the 16×16 256-microtriangle level correction bit widths for full cacheline 128B vs. 64B half cacheline displacement blocks).

In some embodiments, the base anchor points are unsigned (UNORM11) while the corrections are signed (two's complement). A shift value allows for corrections to be stored at less than the full width. Shift values are stored per level with four variants to allow vertices on each of the sub triangle mesh edges to be shifted independently from each other and from vertices internal to the sub triangle. Each decoded value becomes a source of prediction for the next level down.

Compressor—Sub Triangle Encoder

According to some embodiments, a 2-pass approach is used to encode a sub triangle with a given μ-mesh type. See FIG. 14.

The first pass uses the P&C scheme described above to compute lossless corrections for a subdivision level, while keeping track of the overall range of values the corrections take. The optimal shift value that may be used for each edge and for the internal vertices (4 shift values total in one embodiment) to cover the entire ranges with the number of correction bits available is then determined. This process is performed independently for the vertices situated on the three sub triangle edges and for the internal vertices of the sub triangle, for a total of 4 shift values per subdivision level. The independence of this process for each edge is required to satisfy the constraints for crack-free compression.

The second pass encodes the sub triangle using once again the P&C scheme, but this time with lossy corrections and shift values computed in the 1st pass. The second pass uses the first pass results (and in particular the maximum correction range and number of bits available for correction) to structure the lossy correction and shift values—the latter allowing the former to represent larger numbers than possible without shifting. The result of these two passes can be used as-is, or can provide the starting point for optimization algorithms that can further improve quality and/or compression ratio.

A hardware implementation of the P&C scheme may exhibit wrapping around behavior in case of (integer) overflow or underflow. This property can be exploited in the 2nd pass to represent correction values by "wrapping around" that wouldn't otherwise be reachable given the limited number of bits available. This also means that the computation of shift values based on the range of corrections can exploit wrapping to obtain higher-quality results (see "Improving shift value computation by utilizing wrapping" below).

Note that the encoding procedure can never fail per se, and for a given µ-mesh type, a sub triangle can always be encoded. That said, the compressor can analyze the result of this compression step and by using a variety of metrics and/or heuristics decide that the resulting quality is not sufficient. (See "Using displacement direction lengths in the encoding success metric" below.)

In this case the compressor can try to encode the sub triangle with less compressed µ-mesh types, until the expected quality is met. This iterative process can lead to attempting to encode a sub triangle with a µ-mesh type that cannot represent all its µ-triangles. In this case the sub triangle is recursively split in four sub triangles until it can be encoded. In one embodiment, the initial split step splits only when the current subtriangle contains more triangles than can be encoded with the current micromesh type (hence the need to recursively split until the number of microtriangles in the subtriangle matches the number of triangles that can be encoded with the current micromesh type).

Exploiting Mod 2048 Arithmetic

In the above prediction calculation expressions, the compressor tries to compute the correction based on the prediction, the shift and the uncompressed value. But in one embodiment, this correction computation can be a bit tricky when the computation is performed using wrapping arithmetic (e.g., 0, 1, 2, . . . 2046, 2047, 0, 1, 2 . . . ) for mod 2048 arithmetic—which is what the decoder hardware uses in one embodiment when adding the prediction to the correction based on unsigned UNORM11 values. Specifically, while the averaging operation is a typical averaging, the decoded position wraps according to unsigned arithmetic rules when adding the correction to the prediction. Meanwhile, the error metric is in one embodiment not based on wrapping arithmetic. Therefore, it is up to the software encoder to either avoid wrapping based on stored values or to make that wrapping outcome sensible. An algorithm by which the encoder can make use of this wrapping and exploit it to improve quality is described below. An alternative embodiment could clamp the additional results and prevent wraparound (thereby effectively discarding information), but would then lose the ability to improve compression results by exploiting the wraparound behavior. In one embodiment, exploiting the wraparound behavior can decrease error by a factor of 3.

Displacement Compression—A Robust Constant-Time Algorithm for Finding the Closest Correction As described above, corrections from subdivision level n to subdivision level n+1 are signed integers with a fixed number of bits b (given by the sub triangle format and subdivision level) and are applied according to the formula above. Although an encoder may compute corrections in any of several different ways, a common problem for an encoder is to find the b-bit value of c (correction) that minimizes the absolute difference between the d (decoded) and a reference (uncompressed) value r in the formula in FIG. 15, given p (prediction) and s (shift[level][type]).

This is complicated by how the integer arithmetic wraps around (it is equivalent to the group operation in the Abelian group $Z/2^{11}Z$), but the error metric is computed without wrapping around (it is not the Euclidean metric in $Z/2^{11}Z$). An example is provided to further show how this is a nontrivial problem.

Figure 15:
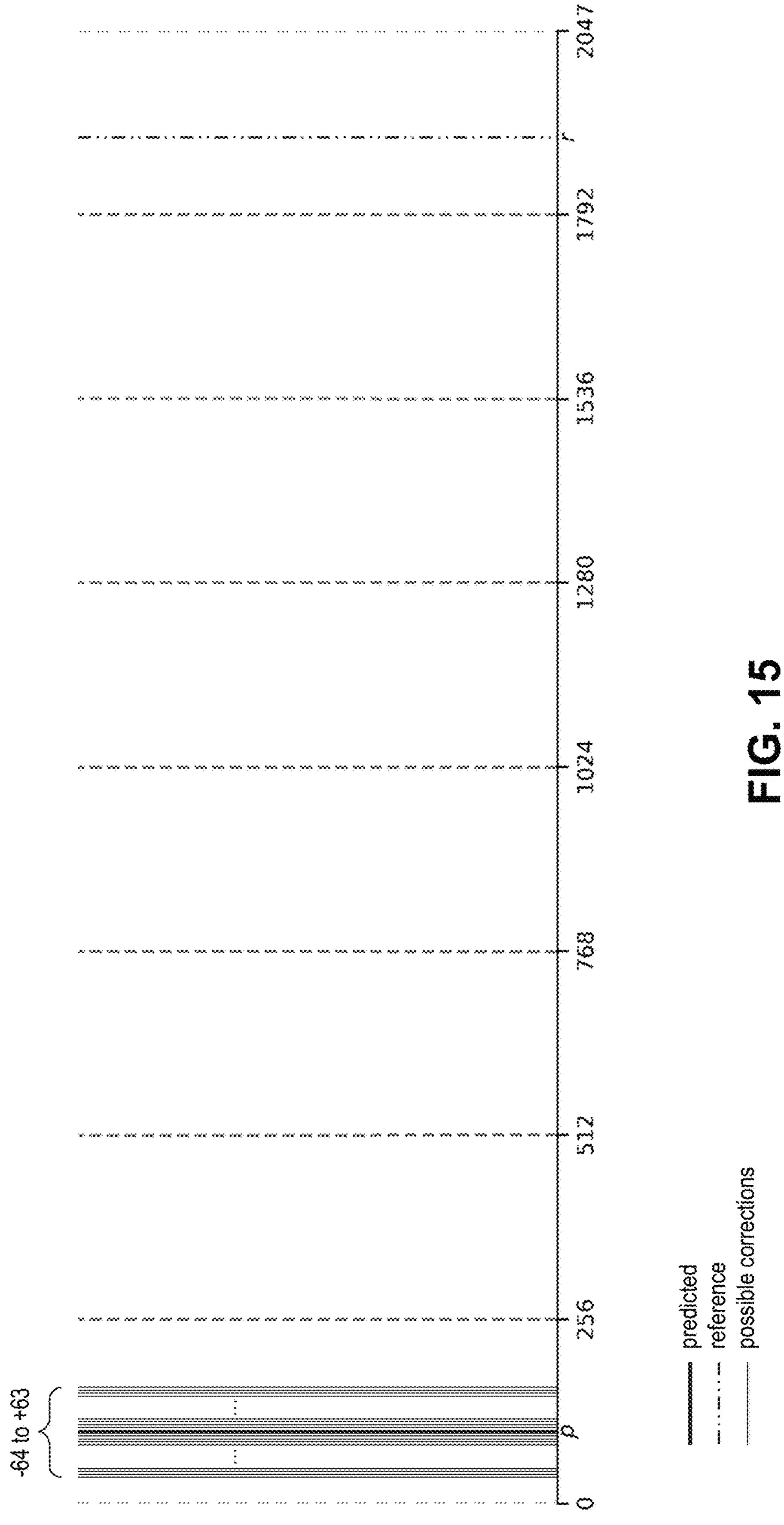
FIG. 15 shows an example number range illustrating a correction problem for case p=100, r=1900, s=0, b=7.

Consider the case p=100, r=1900, s=0, and b=7, illustrated in FIG. 15. The highlighted vertical line p near the left-hand side of the graph shows the predicted displacement value, and the vertical line r shows the reference displacement value that the decoded value should come close to. Note that the two lines are close to opposite extremes of the 11-bit space shown. This can happen relatively often when using a prismoid maximum-minimum triangle convex hull to define the displacement values.

Shown is the number line of all UNORM11 values from 0 to 2047, the locations of predicted value p in thick line and reference value r in a dot-dash line, and in the lighter shade around the thick line of p, all possible values of d for all possible corrections (since b=7, the possible corrections are the signed integers from $-2^6=-64$ to $2^6-1=63$ inclusive).

In this example, there is a shift of 0 and a possible correction range of −64 to +63 as shown by the vertical lines on the left and right side of the prediction line labelled p. The decoder should preferably pick a value that is closest to the r line within the standard Euclidean metric. This would appear to be the right-most vertical line at +63. However, when applying wraparound arithmetic, the closest line to the reference line r is not the right-most line, but rather is the left-most line at −64 since this leftmost line has the least distance from the reference line r using wraparound arithmetic.

In this case, the solution is to choose the correction of c=63, giving a decoded value of d=163 and an error of abs(r-d)=1737. If the distance metric was that of $\mathbb{Z}/2^{11}\mathbb{Z}$, the solution would instead be c=−64, giving a decoded value of d=36 and an error of 183 (wrapping around). So, even though using the error metric of $\mathbb{Z}/2^{11}\mathbb{Z}$ is easier to compute, it produces a correction with the opposite sign of the correct solution, which results in objectionable visual artifacts such as pockmarks.

Figure 16:
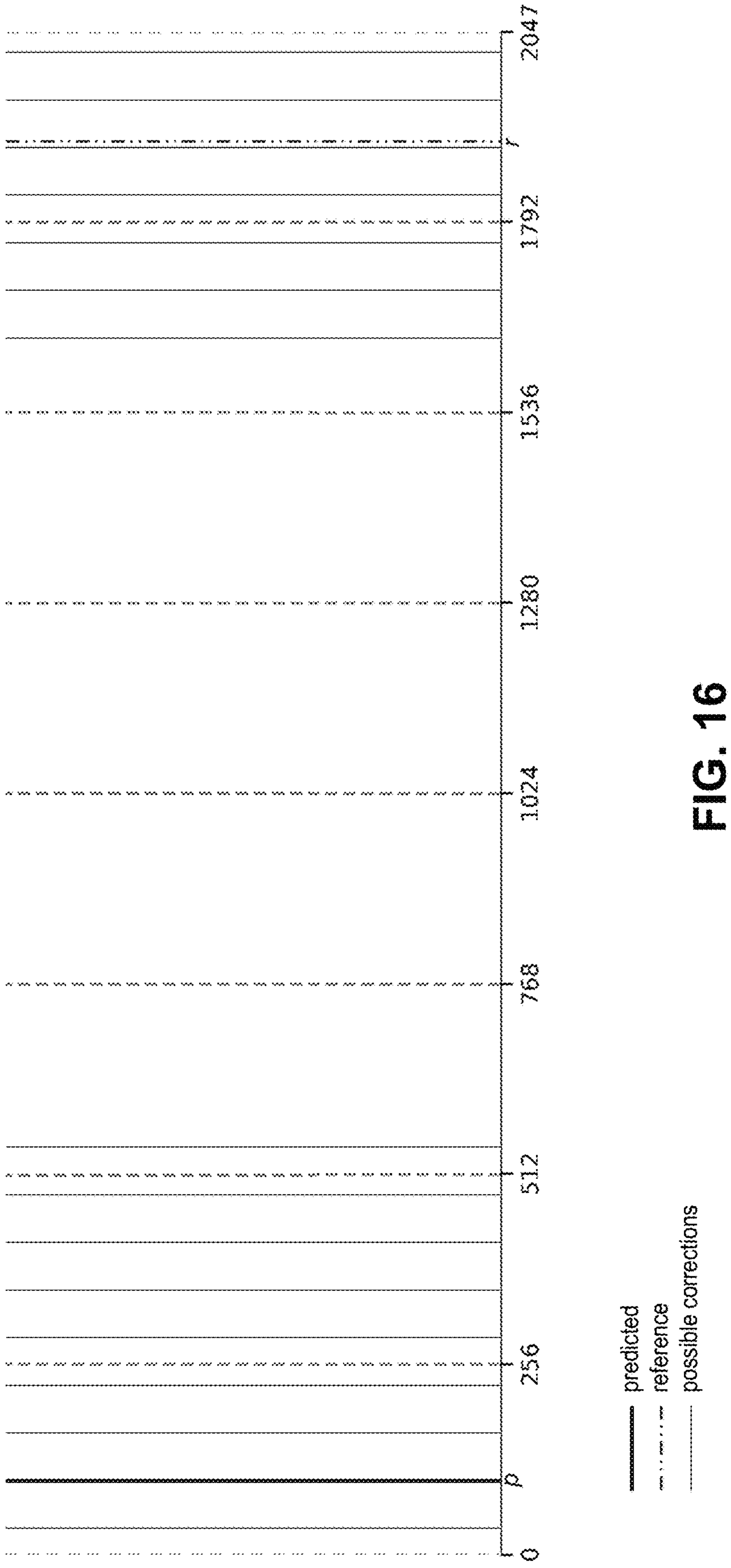
FIG. 16 shows an example number range illustrating the correction problem case p=100, r=1900, s=6, b=3.

Next, consider the case p=100, r=1900, s=6, and b=3, illustrated in FIG. 16. Here, fewer bits and a nonzero shift are seen. The lines around p and r are $2^s=32$ apart and wrap around the ends of the range. The shift is specified as 6 and there are only three bits of correction to work with, so the correction values are 64 apart. The possible corrections are the integers from −8 to 7 inclusive as indicated by the vertical lines.

In this case, the solution is to choose the correction of c=−4, giving a decoded value of d=1892 and an error of abs(r-d)=8. The wraparound behavior may be exploited to get a good result here, but by doing so, it is seen that a nonzero shift can give a lower error than the previous case, even with fewer bits.

Other scenarios are possible. The previous scenario involved arithmetic underflow; cases requiring arithmetic overflow are also possible, as well as cases where no overflow or underflow is involved, and cases where a correction obtains zero error.

The below presents pseudocode for an algorithm that given unsigned integers $0 \le p < 2048$, $0 \le r < 2048$, an unsigned integer shift $0 \le s < 11$, and an unsigned integer bit width $0 \le b \le 11$, always returns the best possible integer value of c (between $-2^b$ and $(2^b)-1$ inclusive if b>0, or equal to 0 if b=0) within a finite number of operations (regardless of the number of b-bit possibilities for c). In the illustrated pseudocode for the sequential algorithm steps 1-8 below, non-mathematical italic text within parentheses represent comments, and modulo operations (mod) are taken to return positive values.

(Early check for the zero-bit case) If b is equal to 0, return 0.

(Range of representable values around 0 with shift applied is −nR . . . pR−1) Set $nR=2^{b-1+s}$, $pR=nR-2^{s}$.

(Difference in $\mathbb{Z}$) Set signed integer d=r−p.

(Is the reference value between the two extreme corrections?) If (d mod 2048)>pR and 2048−(d mod 2048)>nR:

a. (Set iLo and iHi to extreme correction values) Set $iLo=-2^{(b-1)}$, $iHi=2^{(b-1)}-1$.

b. Proceed to "Compute error . . . " step after the next one.

Otherwise: (The reference value is between two representable values; find them in $\mathbb{Z}/2^{11}\mathbb{Z}$; then the ideal correction must be one of the two.)

a. Set uD to d−2048 if d>pR, d+2048 if d<−nR, and d otherwise.

b. Set iLo to floor $$\left(\frac{uD}{2^{s}}\right),$$

using floating-point arithmetic for the division.

c. Set iHi to iLo+1.

(Compute error for iLo) Set eLo to the absolute difference of r, and the result of substituting correction=iLo into Formula 1 above.

(Compute error for iHi) Set eHi to the absolute difference of r, and the result of substituting correction=iHi into Formula 1.

(Choose the option with lower error) If eLo≤eHi, return iLo. Otherwise, return iHi.

Basically, the pseudocode algorithm recognizes that the reference line r must always be between two correction value lines within the representable range or exactly coincident with a correction value line within the range. The algorithm flips between two different cases (the reference value between the two extreme corrections or the reference value is between two representable values), and chooses the case with the lower error. Basically, the wraparound case provides a "shortcut" for situations where the predicted and reference values are near opposite ends of the bit-limited displacement value range in one embodiment.

Compressor—Improving Shift Value Computation by Utilizing Wrapping

Minimizing the size of the shift at each level for each vertex type may improve compression quality. The distance between the representable corrections (see the possible decoded values shown in FIGS. 17 and 18) is proportional to 2 to the power of the shift for that level and vertex type. Reducing the shift by 1 doubles the density of representable values, but also halves the length of the span represented by the minimum and maximum corrections. Since algorithms to compute corrections can utilize wraparound behavior, considering wraparound behavior when computing the minimum shift required to cover all corrections for a level and vertex type can improve quality.

Figure 17:
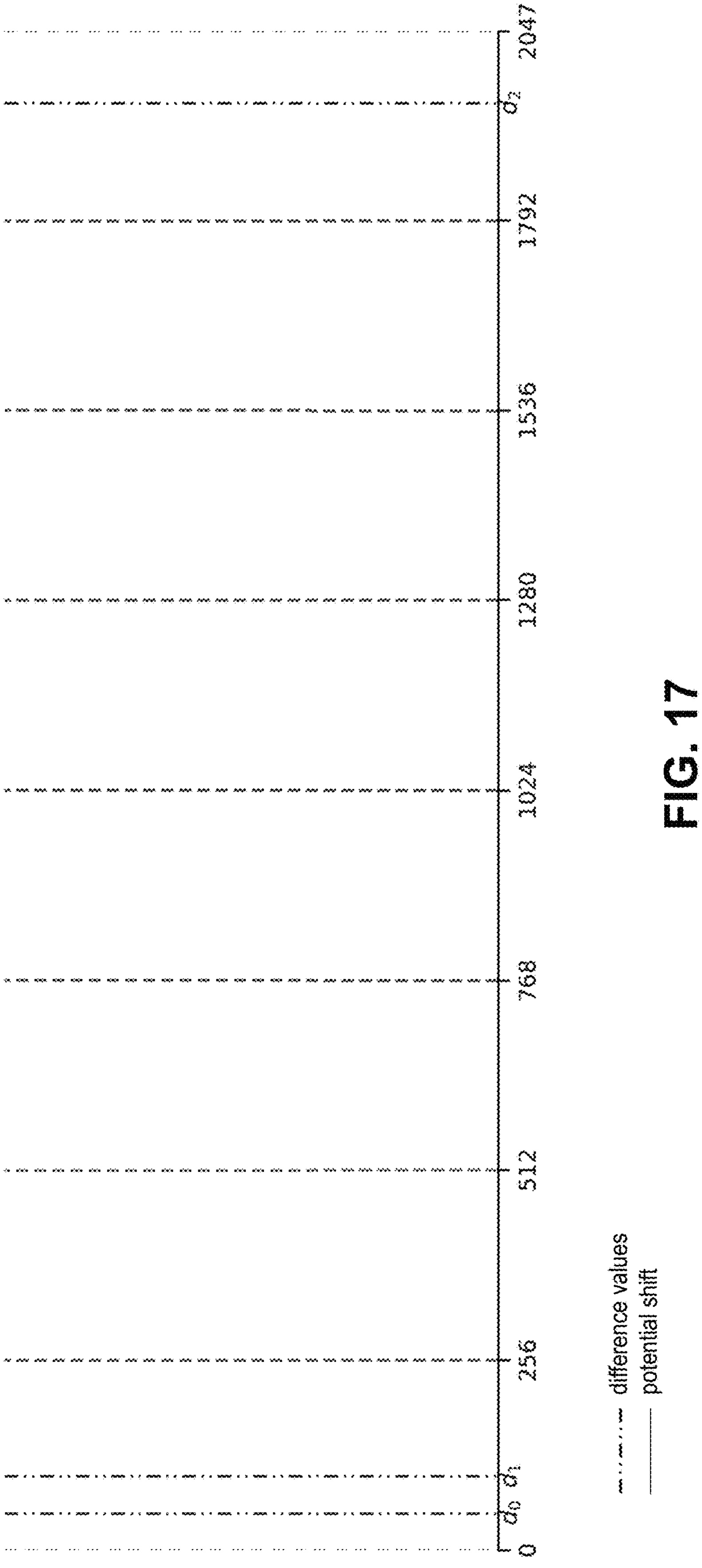
FIG. 17 shows an example distribution of differences between reference and predicted values mod 2048 for a particular sub triangle, correction level, and vertex type. Since the differences cluster around 0 and 2047, utilizing wraparound behavior may allow for more precision here.
Figure 18:
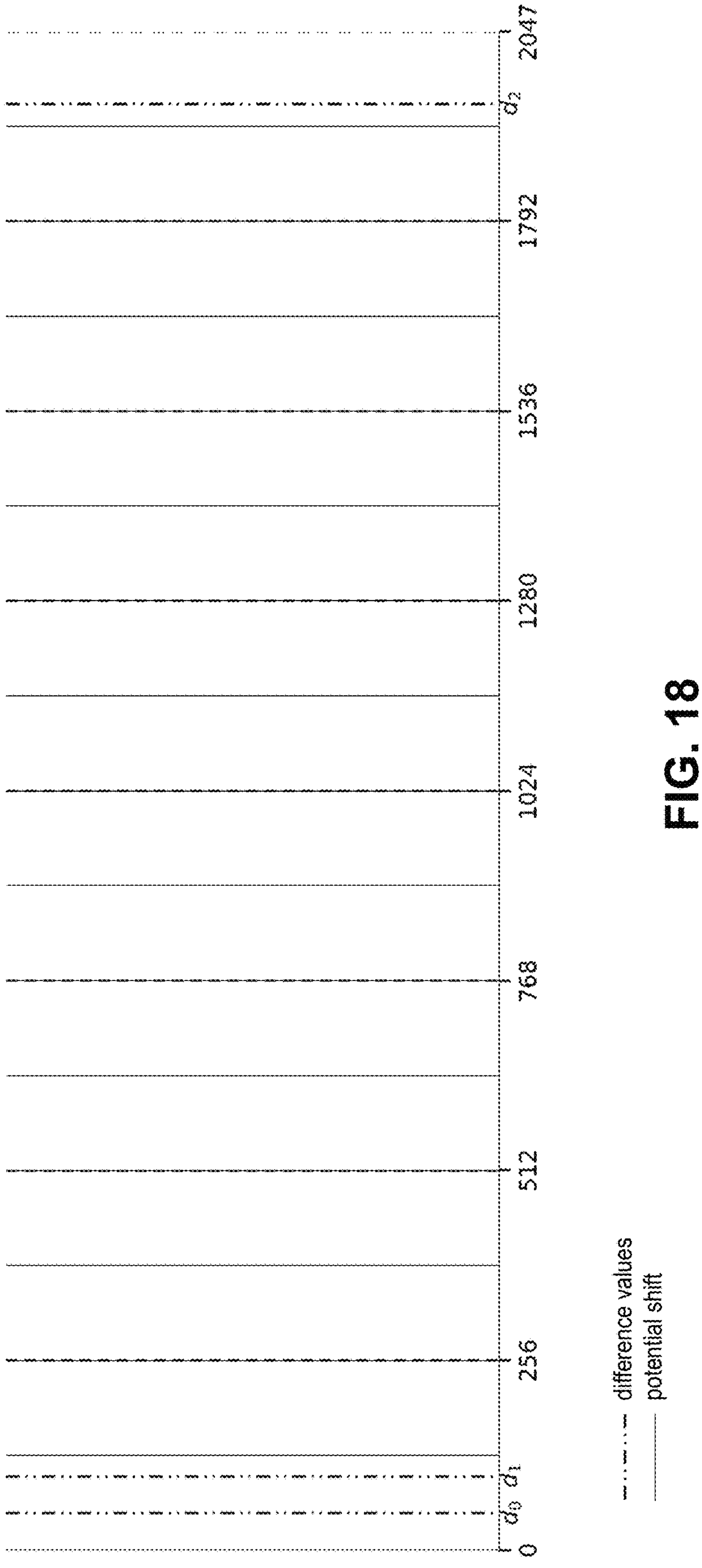
FIG. 18 shows how choosing shifts that span the full range of possible differences without considering wrapping may result in large errors (distance between each dash-dot-dot line and its closest vertical solid line).
Figure 19:
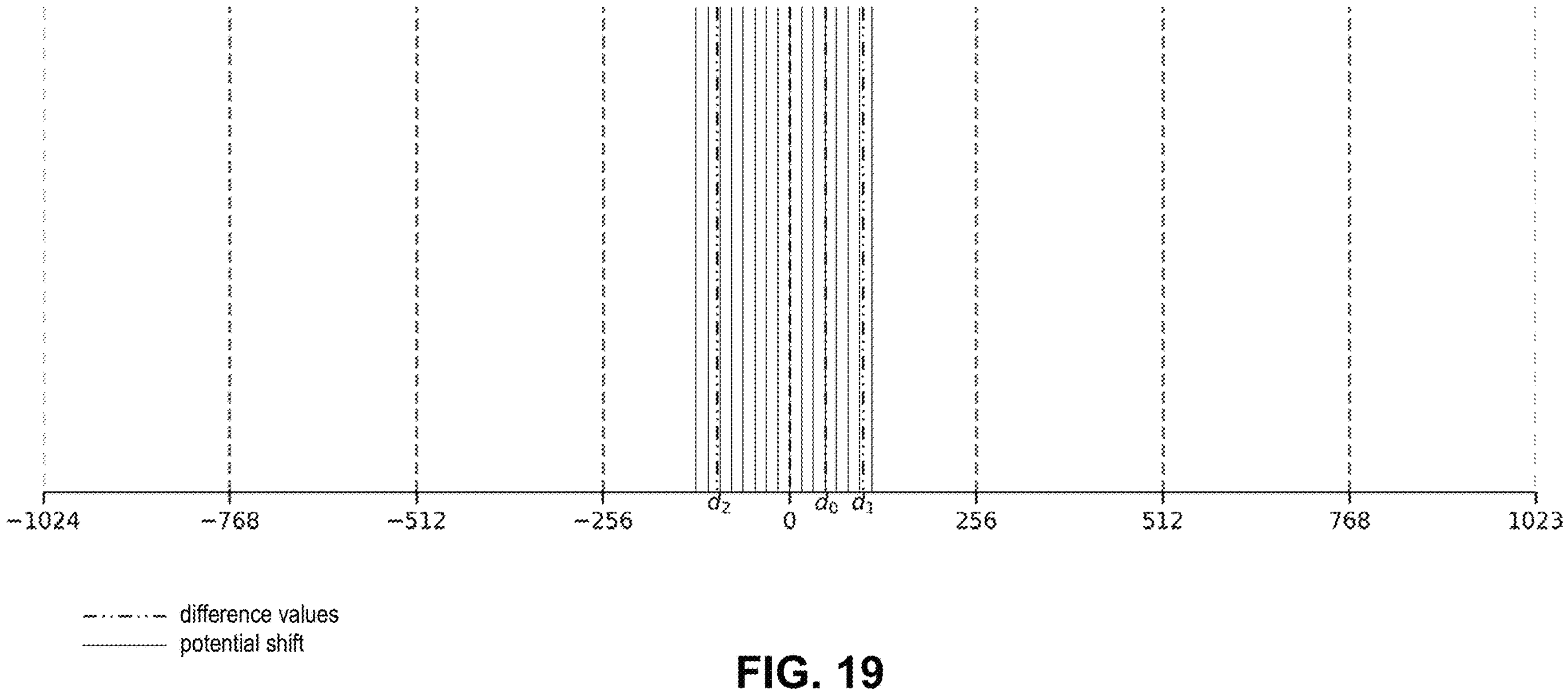
FIG. 19—Displacement differences wrapped to the range—1024 . . . 1023. The wrapped values cluster around 0, and their minimum and maximum give shifts such that the representable differences from shifted corrections (solid vertical lines) are closer to the differences, using the distance metric from $Z/2^{11}Z$ (though note that this is not the metric ultimately used for correction), improving quality.

For instance, consider a correction level and vertex type where the differences mod 2048 between each reference and predicted value are distributed as in FIG. 17. In the first example, there are large shifts and some finite number of bits (e.g., 4 bits in this example—providing 16 possible shifted correction values), the large shifts will result in large difference between the possible shifted correction values, which means there is not much precision between the shifted possible correction values. If the amount of shift is reduced, the distance between the possible shifted correction values becomes smaller and the precision increases (see FIG. 18). Thus, by choosing the shift values well, the compression is improved because the shifted correction values will be closer to the reference value.

In more detail, FIG. 17 shows lossless corrections as $d_0$, $d_1$, $d_2$ (in this example +50, +100 and +1900 (−148), respectively). Based on these values, it appears that shift values that cover the entire space between +100 and −148 are required, which suggests large (but low precision) shift values which will result in higher errors due to quantization. Hence, an algorithm that does not consider wrapping may conclude that it requires the maximum possible shift to span all such differences. See FIG. 18. However, since corrections may be negative and may wrap around, a smaller shift may produce higher quality results.

One possible algorithm may be as follows. Subtract 2048 from (differences mod 2048) that are greater than 1024, so that all wrapped differences $w_i$ will lie within the range of integers—1024 . . . 1023 inclusive. See FIG. 18. This effectively places all the values within a subset of the original range—and transforms values that formerly were far apart so they are now close together. The resulting significantly smaller shifts come much closer to coinciding with the reference value.

Then compute the shift s given the level bit width b as the minimum number s such that $$2^{s}(2^{b}-1)\geq\max(w_i)$$

and $$-2^{s}(2^{b})\leq\min(w_i).$$

Figure 14:
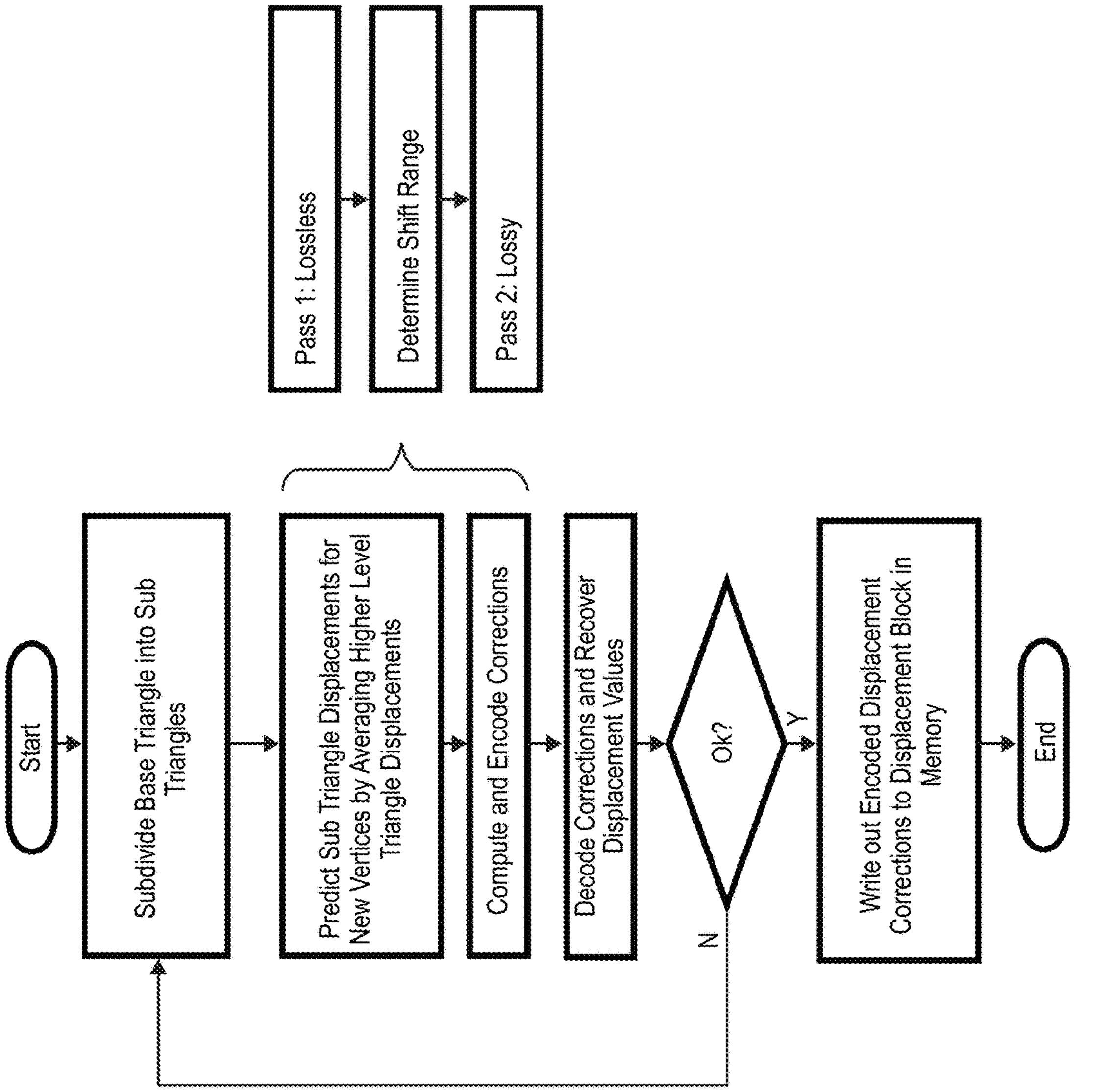
FIG. 14 shows an example compression process.

In one example, this transform can be included as part of "pass one" of an encoder to compute lossless corrections (see FIG. 14). Thus, pass one keeps track of the loss for each vertex and vertex type, computes the lossless corrections, perform the transformation into a subset of the range, and tracks minimum and maximum lossless corrections over that range subset. The optimal shift value is computed based on the minimum and maximum lossless corrections. The second pass computes the lossy corrections from the predicted values, the shift values and the lossless corrections. Those lossy corrections and the shifts are packed together and written out into the compressed block.

Compressor—Using Displacement Ranges in the Encoding Success Metric

A method for interpreting scaling information as a per-vertex signal of importance, and a method for using per-vertex importance to modify the displacement encoder error metric are described. This improves quality where needed and reduces size where quality is not as important.

As described above, each vertex has a range over which it may be displaced, given by the displacement map specification. For instance, with the prismoid specification, the length of this range scales with the length of the interpolated direction vector and the interpolated scale. Meanwhile, the decoded input and output of the encoded format has fixed range and precision (UNORM11 values) as discussed above. This means that the minimum and maximum values may result in different absolute displacements in different areas of a mesh—and therefore, a UNORM11 error of a given size for one part of a mesh may result in more or less visual degradation compared to another.

In one embodiment, a per-mesh-vertex importance (e.g., a "saliency") is allowed to be provided to the encoder such as through the error metric. One option is for this to be the possible displacement range in object space of each vertex (e.g., distance x scale in the prismoid representation—which is a measure of differences and thus computed error in object space); however, this could also be the output of another process, or guided by a user. For example, an artist could indicate which vertices have higher "importance" to achieve improved imaging results, e.g., so higher quality is provided around a character's face and hands than around her clothing.

The mesh vertex importance is interpolated linearly to get an "importance" level for each μ-mesh vertex. Then within the error metric, the compressed versus uncompressed error for each error metric element is weighted by an error metric "importance" derived from the element's μ-mesh vertices' level of "importance". These are then accumulated and the resulted accumulated error— which is now weighted based on "importance" level—is compared against the error condition(s). In this way, the compressor frequently chooses more compressed formats for regions of the mesh with lower "importance", and less compressed formats for regions of the mesh with higher "importance".

Compressor—Constraints for Crack-Free Compression

Figure 5:
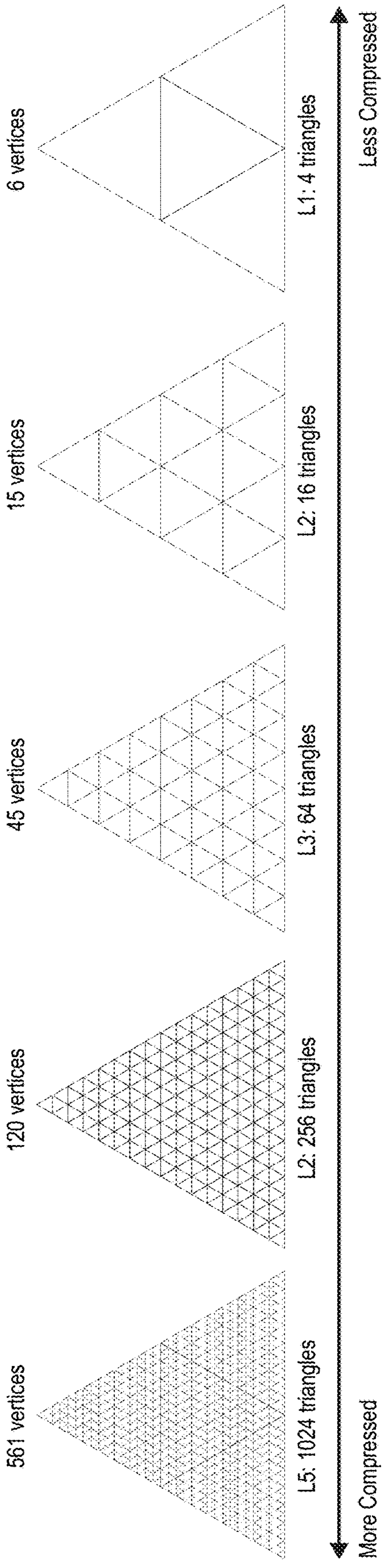
FIG. 5 shows an example spectrum of tessellation levels from more to less compressed reading left to right.

The discussion above explains how a compressor can compress a micromesh defined by a base triangle. By organizing the μ-mesh types from most to least compressed as shown in FIG. 5, the embodiments can proceed to directly encode sub triangles in "compression ratio order" using the P&C scheme described above, starting with the most compressed μ-mesh type, until a desired level of quality is achieved. This scheme enables parallel encoding while maximizing compression, and without introducing mismatching displacement values along edges shared by sub triangles.

Figure 20B:
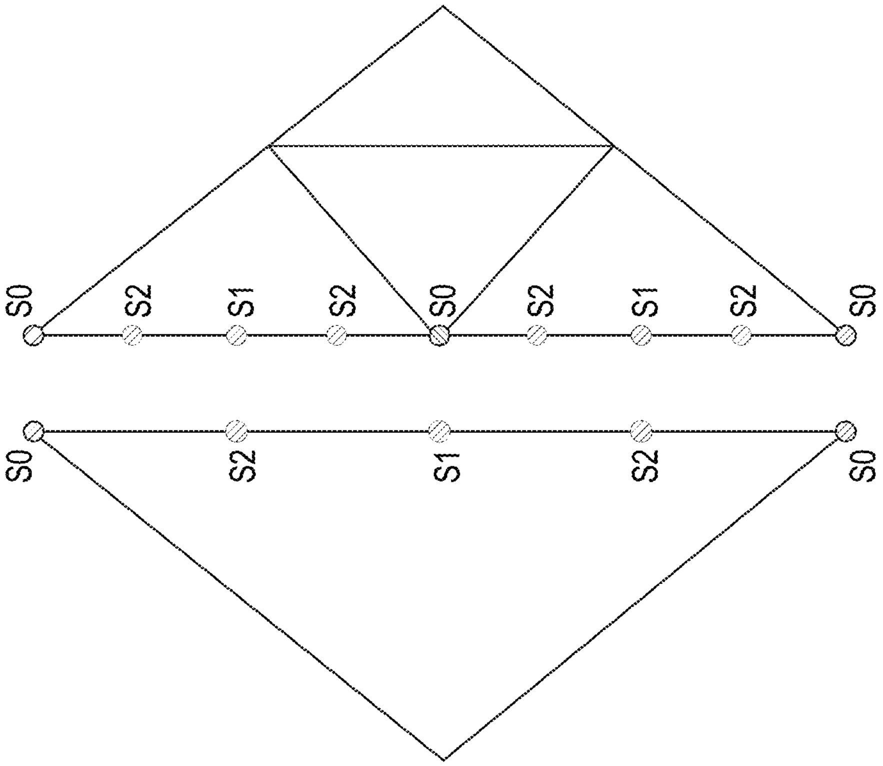
FIGS. 20A, 20B, 20C illustrate different adjoining sub triangle situations.
Figure 20A:
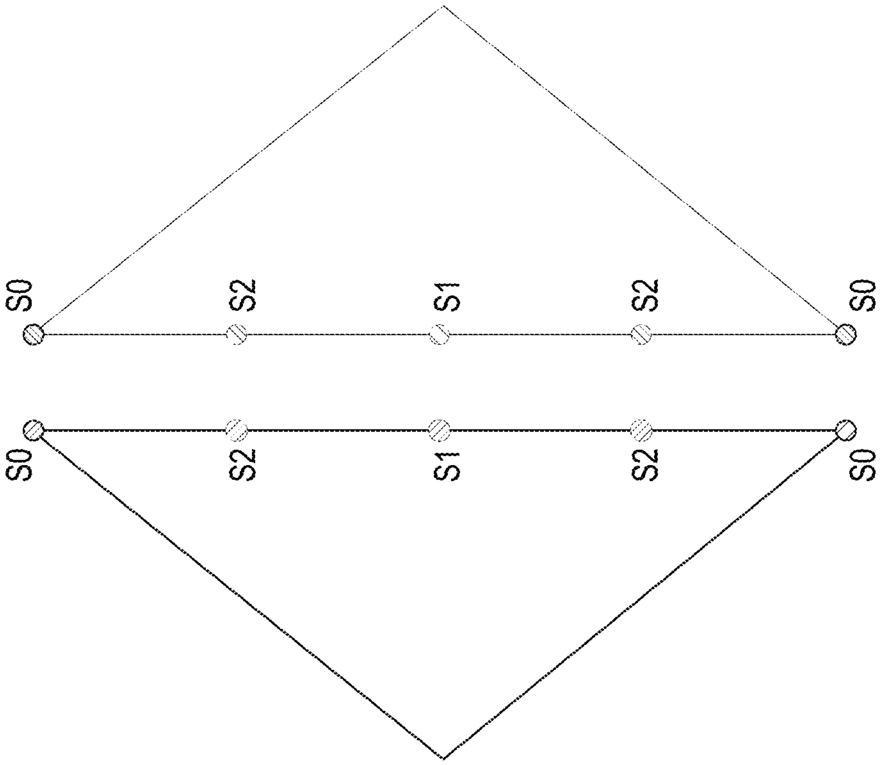

FIG. 20A illustrates the case of two sub triangles sharing an edge. Both sub triangles are tessellated at the same rate but are encoded with different μ-mesh types. In the Figure, the space between the two triangles is just for purposes of more clear illustration.

In the example shown, the microvertices are assigned a designator such as "S1". Here, the letter "S" refers to "subdivision" and the number following refers to the number of the subdivision. Thus, one can see that "S0" vertices on the top and bottom of the shared edge for each sub triangle will be stored at subdivision level zero—namely in uncompressed format. A first subdivision will generate the "S1" vertex at subdivision level 1, and a second subdivision will generate the "S2" vertices at subdivision level 2.

To avoid cracks along the shared edge, the decoded displacement values of the two triangles must match. S0 vertices match since they are always encoded uncompressed. S1 and S2 vertices will match if and only if (1) the sub triangle is encoded in "compression ratio order" and (2) displacement values encoded with a more compressed μ-mesh type are always representable by less compressed μ-mesh types. The second constraint implies that for a given subdivision level a less compressed μ-mesh type should never use fewer bits than a more compressed μ-mesh type. For instance, if the right sub triangle uses a μ-mesh type more compact than the left sub triangle, the right sub triangle will be encoded first. Moreover, the post-encoding displacement values of the right sub triangle's edge (i.e., its edge that is shared with the right sub triangle) will be copied to replace the displacement values from the left sub triangle. Property (2) ensures that once compressed, the displacement values along the left sub triangle's edge is losslessly encoded, creating a perfect match along the shared edge.

In this example, these two sub triangles are encoded with different micromesh types (for example, assume the sub triangle on the left is more compressed than the sub triangle on the right). As discussed above, the compressor in one embodiment works from more compressed to less compressed formats, so in this case, displacements for the sub triangle on the left will be encoded first. So let's assume the displacements for the sub triangle on the left have already been successfully encoded and a processor is now trying to encode the displacements for the sub triangle on the right—and in particular, displacements for the microvertices of the triangle on the right that lie on the edge shared between the two triangles. The displacement values to be encoded to the shared edge microvertices of the right side sub triangle must match, bit for bit, the displacement values already encoded for the shared edge vertices of the left side sub triangle. Cracking may result if they don't match exactly.

If the shared edge vertices on the right side triangle are going to match bit-for-bit the shared edge vertices on the left side triangle, the number of bits used to represent displacement for the right side triangle must be equal to or greater than the number of bits used to represent displacement for the left side triangle. For this reason, the vertices facing one another on the left and right sub triangle shared edge have the same subdivision level—for example, a left side S0 vertex matches a right side S0 vertex, a left side S1 vertex matches a right side S1 vertex, a left side S2 vertex matches a right side S2 vertex and so on. Thus, on edges shared between sub triangles, a less compressed displacement format can never use fewer bits for a given subdivision level than a facing, more compressed displacement format. For example, if you imagine recording on horizontal line such as in a spreadsheet, the number of bits assigned to represent the vertices for a given subdivision level across all the different micromesh types sorted from more compressed to less compressed, will form a monotonic sequence that increases, or does not change, and cannot decrease. In other words, there can never be fewer bits for a given subdivision level in the less compressed type than there are bits in the more compressed type. Example embodiments impose this constraint on the encoding scheme to guarantee watertightness assuming the encoding algorithm is deterministic (it does not have any stochastic components).

FIG. 20B is a bit more complicated because the tessellation rates of the sub triangles on the left and the right are now different. In particular, FIG. 20B illustrates the case of an edge shared between triangles with different tessellation rates (2× difference) but encoded with the same μ-mesh type. To ensure decoded displacements match from both sides of the shared edge, values encoded at a given level must also be representable at the next subdivision level (e.g., see S1-S2 and S0-S1 vertex pairs). While there are many ways to do this, in one particular embodiment, this can be accomplished if and only if (1) sub triangles with lower tessellation rate are encoded before sub triangles with higher tessellation rate and (2) for a given μ-mesh type the correction bit width for subdivision level N is the same or smaller than for level N−1. In other words, this latter property dictates that for a μ-mesh type, the number of bits sorted by subdivision level should form a monotonically decreasing sequence. For instance, the left triangle in FIG. 20B will be encoded first, and its post-decoding displacement values will be copied to the vertices shared by the three triangles on the right-hand side, before proceeding with their encoding.

Thus, in this example, we see 2× more vertices on the right than on the left, Some edge vertices shared between the sub triangles on the left and the right do not belong to the same subdivision level. For example, "S2" vertices on the left side sub triangle face S1 vertices on the right side sub triangle, and S1 vertices on the left side sub triangle face S0 vertices on the right side sub triangle. Therefore, the number of bits assigned to encode the same shared vertices for the left and right side sub triangles are not necessarily the same.

In particular, in one embodiment, the higher (tessellation rate) subdivision levels are assigned fewer bits per vertex for displacement encoding so it is likely that the number of bits available to encode for example S1 is going to be higher than the number of bits available to encode S2 for example. However, as discussed above, when processing sub triangles having different tessellation rates, it is preferable in some embodiments to encode lower tessellation rate sub triangles before encoding adjoining higher tessellation rate triangles in order to guarantee that the information associated with the adjoining sub triangle can match bit-for-bit. Specifically, since fewer bits may be available for encoding higher tessellation rate sub triangle on the right, it will otherwise not be guaranteed that the vertex encoding for the higher tessellation rate sub triangle on the right as compared to the lower tessellation rate sub triangle on the left. First encoding the sub triangle with the lower tessellation rate on the left will ensure that the higher tessellation rate sub triangle on the right will be able to represent the same vertex information so long as within a micromesh type, the number of displacement encoding bits for increasingly deep/recursive subdivision levels does not increase:

# bits for subdivision level $k \leq$ # bits for subdivision level j where j is any less subdivided level (lower tessellation ratio) than k.

To summarize, when encoding a triangle mesh according to some high performance embodiments, the following constraints on ordering are adopted to avoid cracks in the mesh:

- Sub triangles are encoded in ascending tessellation-rate order (encode adjoining sub triangle with the lower tessellation rate first); and
- Sub triangles with the same tessellation rate are encoded in descending compression rate order (starting with highest desired compression rate).

Thus, the following constraints are imposed on correction bit widths configurations in some embodiments:

- For a given μ-mesh type, a subdivision level never uses fewer bits than the next (more compressed) level; and
- For a given subdivision level, a μ-mesh type never uses fewer bits than a more compressed type.

The rule above accounts for micromesh types that represent the same number of microtriangles (i.e. same number of subdivisions), but with different storage requirements (e.g. 1024 microtriangles in 128B or 64B).

In one embodiment, the effective number of bits used to represent a displacement value is given by the sum of its correction and shift bit widths. Also, in the example of FIG. 20B, the vertices on a sub triangle edge shared with another sub triangle in the mesh will be assigned a zero correction—their displacement values will be purely the result of prediction, i.e., the interpolation or average of the displacement values of their neighboring vertices on the edge. Furthermore, in one embodiment, a technique we call "decimation" (where the hardware deletes vertices when creating 3D representations of microtriangles for ray intersection testing) can be used to change the topology of sub triangles with adjoining edges to avoid T junctions.

Figure 20C:
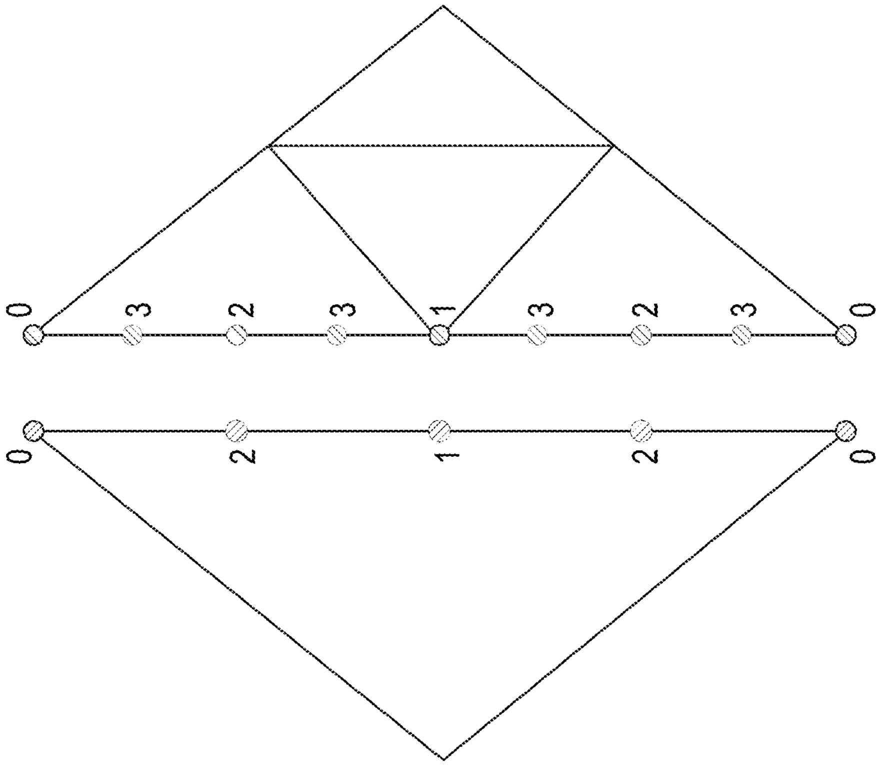

FIG. 20C shows an additional example situation where two adjoining sub triangles have different subdivision tessellation rates and have also been encoded with different micromesh types. Following the above example constraints, the sub triangle on the left will be encoded before the sub triangle on the right because it has a lower resolution and a more compressed micromesh type. The encoded values from the left sub triangle along the shared edge are then copied to the right sub triangle in order to encode the right sub triangle. However, it will be seen that the sub triangle on the right will present more vertices than the sub triangle on the left. In this special case where the micromesh types of the two sub triangles are not the same, example embodiments set a flag on the right triangle edge which prompts the encoder to inspect and check the encoded vertices of the right sub triangle to ensure they have been encoded without error. To clarify, the vertices in the right triangle that must be encoded without error are the ones that also exist (match) on the left triangle, i.e., the ones at 2 and 2 and 1 and 1. If a loss is detected, the encode marks the sub triangle as failing to have been encoded successfully, and the encoder will attempt again with a less compressed micromesh type such as in the example discussed above. It is noted that in one example, the encoder could repeat the encoding process using a format providing more bits per vertex displacement (e.g., a full cacheline format as opposed to a half cacheline format). Keeping the numbers of subdivisions constant, while changing the number of bits/storage, is equivalent to changing micromesh type. i.e., in one embodiment a micromesh type is determined by number of subdivision levels AND the associated memory storage. In some cases, in order to ensure the encoder output is compliant and compatible with hardware decoders that operate only on predetermined encoding formats, this may force the encoder to choose a different micromesh type for the sub triangle on the right-hand side so it has the same micromesh type as the sub triangle on the left-hand side.

These example constraints allow different sub triangles in the mesh to be processed independently (both encoding and then subsequent decoding) by high performance, asynchronous parallel processing while ensuring those processes will independently derive the same displacement values for vertices shared between adjacent sub triangles when encoding the mesh and preventing situations where a larger precision data representation is being squeezed into a smaller number of bits, which would result in a loss of numerical resolution and thus the inability to provide a bit-for-bit match of displacement values at interfacing vertices of different sub triangles. It's a little like interviewing different eyewitnesses of an important event independently in different rooms without letting them talk to one other, and each witness agreeing on exactly the same sequence of events.

Compressor—Mesh Encoder (Uniform)

Figure 21B:
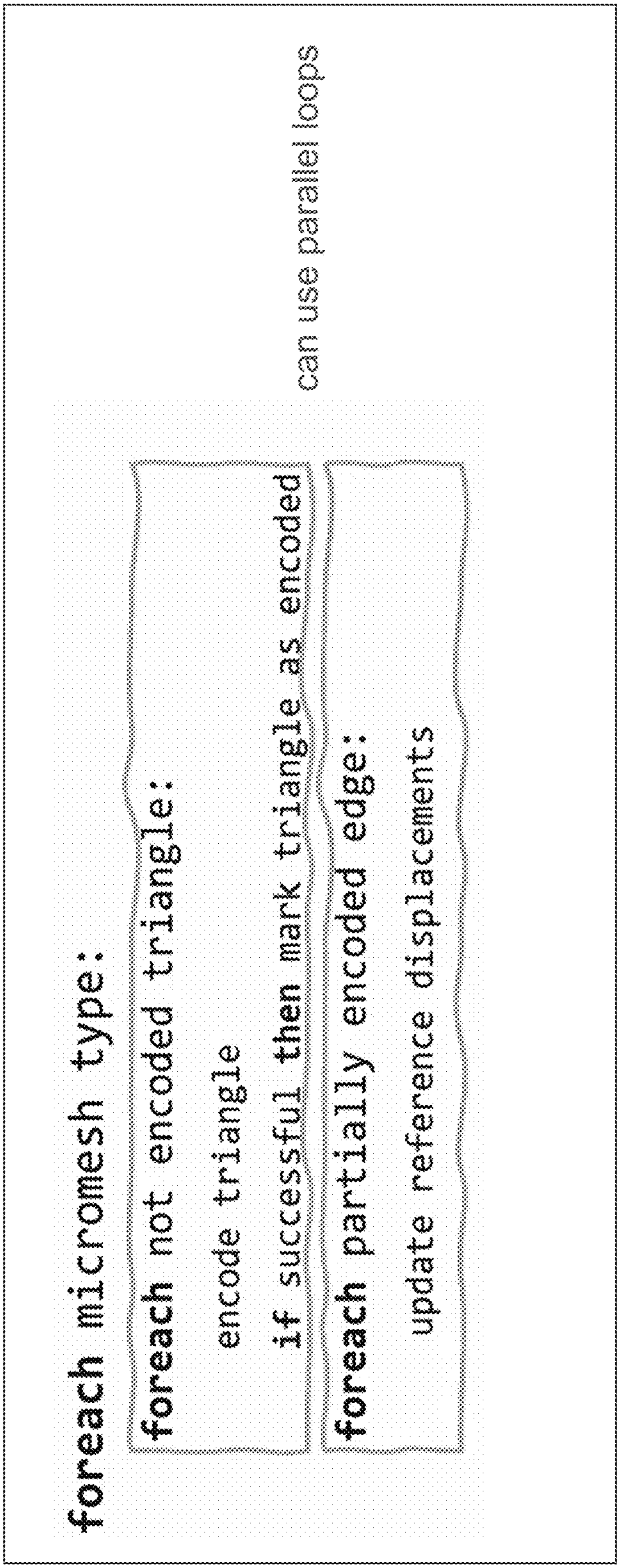

The pseudo-code below and shown in FIG. 21, 21A, 21B illustrates how encoding of a uniformly tessellated mesh operates according to some embodiments:

```
foreach micromesh type (from most to least compressed):
    foreach not encoded sub triangle:
        encode sub triangle
```

-continued

```
            if successful then mark sub triangle as encoded
                foreach partially encoded edge
                    update reference displacements in not-yet-encoded
sub triangles.
```

Note that each sub triangle carries a set of reference displacement values, which are the target values for compression. An edge shared by an encoded sub triangle and one or more not-yet-encoded sub triangles is deemed as "partially encoded". To ensure crack-free compression its decompressed displacement values are propagated to the not-yet-encoded sub triangles, where they replace their reference values.

Figure 22:
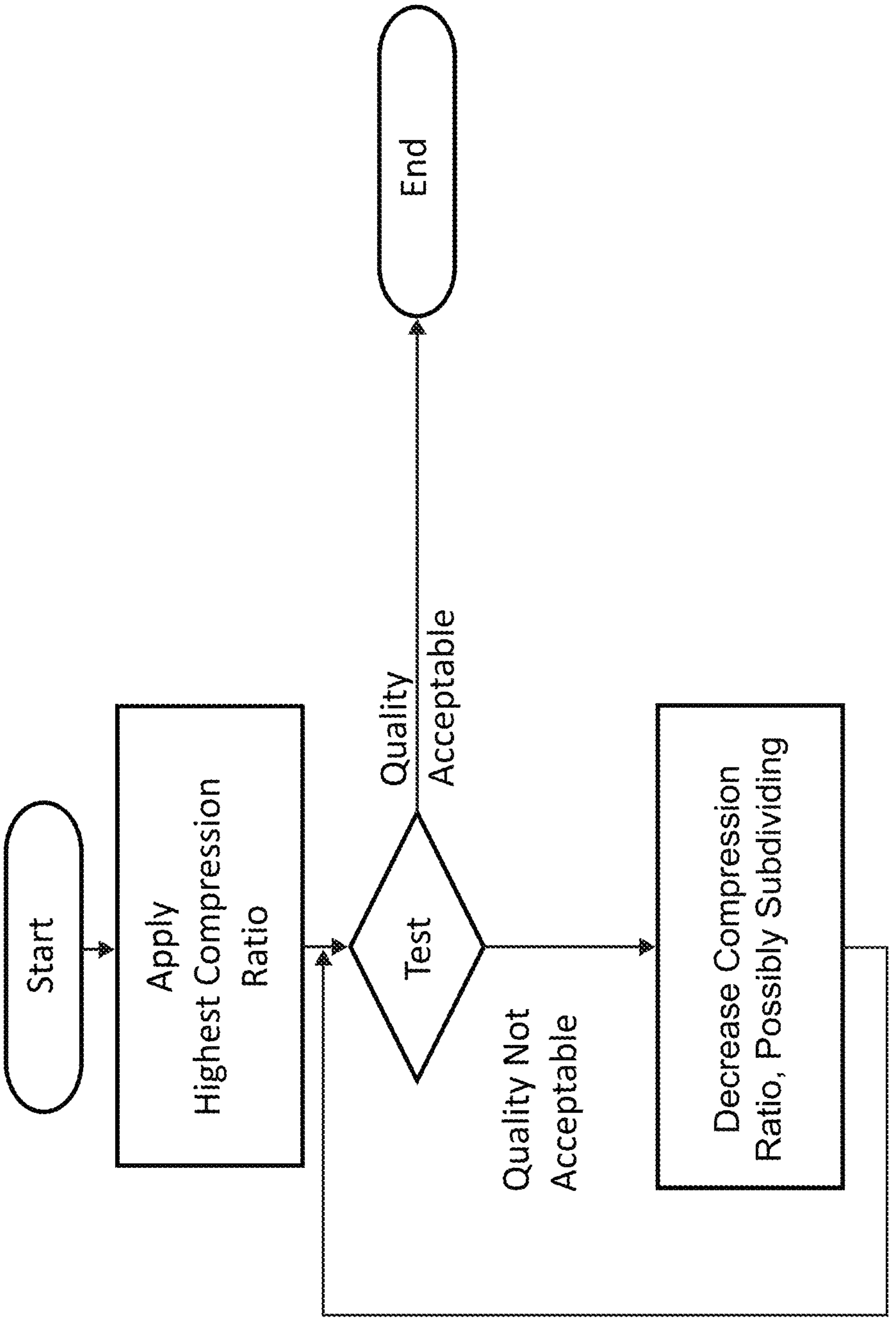
FIG. 22 shows an example compression algorithm.

The FIG. 22 flowchart and the flip chart animation sequence of sub triangle tessellation levels of FIGS. 23A-23F show an example implementation of the above pseudocode. An example algorithm begins with the most compressed possibility for the level of detail desired—in this case a level 6 triangle tessellated to have 4096 microtriangles. As FIG. 22 shows, the builder uses the algorithms above to create displacement blocks and then tests whether the quality is acceptable or not (this test can be performed based on a number of different heuristics, metrics artificial intelligence, deep neural networks, or other tests). If the quality is acceptable, the builder writes out the displacement blocks and is done. If the quality is unacceptable, the builder decreases the compression ratio and tries again. Such decrease in compression may involve subdividing more or using different storage for the same number of microtriangles/subdivisions (see FIG. 23B).

Figure 23A:
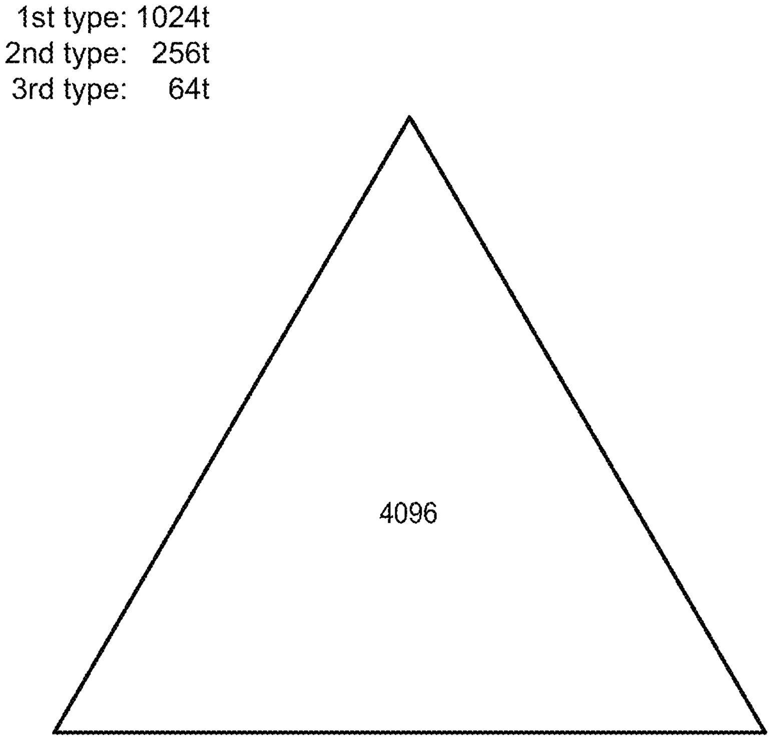
FIGS. 23A-23F are together a flip chart animation showing subdivision of a base triangle.
Figure 23B:
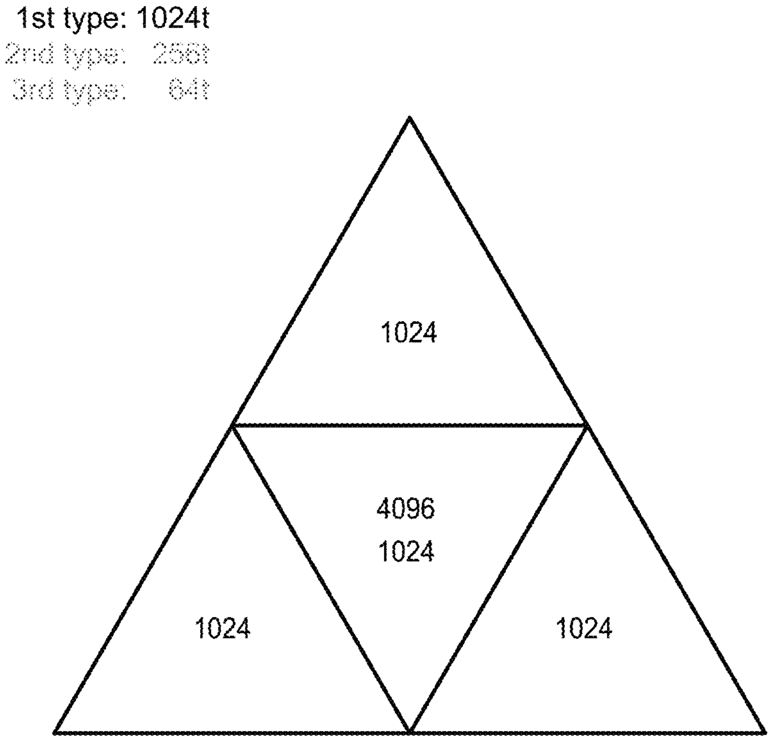
Figure 23C:
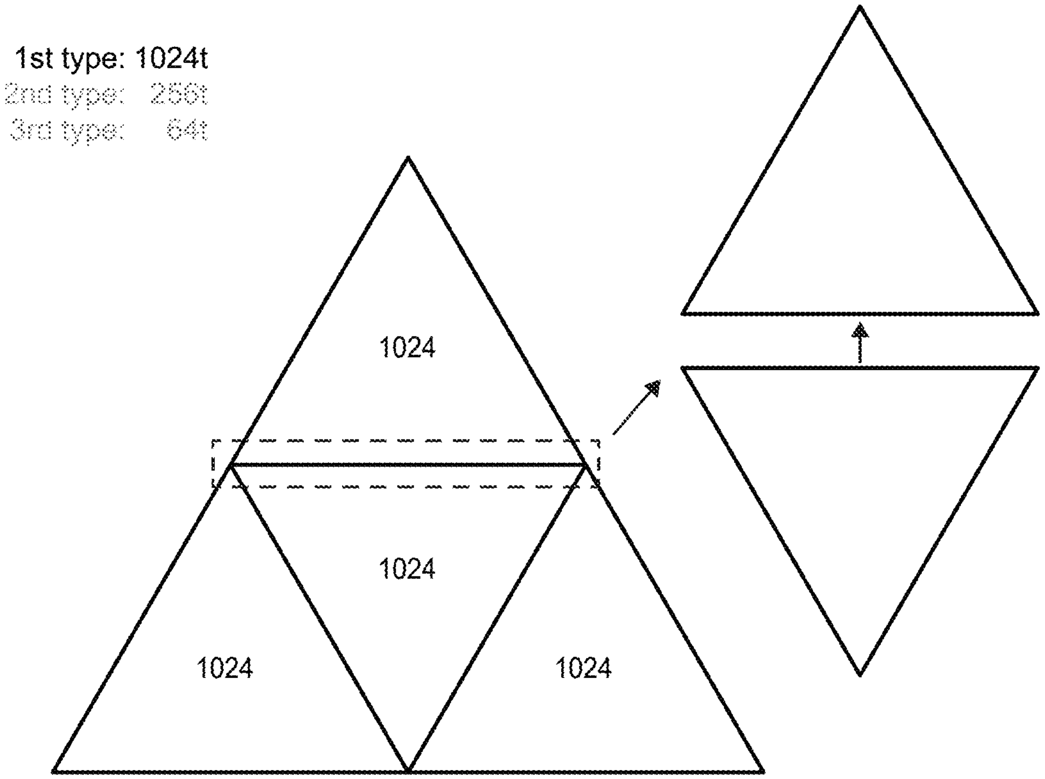

In this case, the builder has subdivided the FIG. 23A sub triangle into four level 5 triangles each defining 1024 microtriangles. As FIG. 22 flowchart shows, the process is repeated to create and test displacement block information. Assume now that the three lower sub triangles provide acceptable quality at the level 5 tessellation level, but that the top triangle does not. This means the builder must subdivide the top triangle to tessellation level 4 (see FIG. 23B). But in the FIG. 23C situation, the compression level of the top sub triangle is going to be different from the compression level of the bottom sub triangles.

This is where the algorithm takes advantage of a constraint that the less compressed top sub triangle vertex formats must be able to represent the more compressed vertex formats of the lower sub triangles. This may sound like a redundant requirement—won't a less compressed format always be able to represent the values of a more compressed format? Not necessarily—if both formats use lossy compression, there exists the possibility that a less compressed format will not be able to represent certain values that a more compressed format is able to represent. However, if such a situation were allowed to occur, the result would be cracks in the mesh. Accordingly, in example embodiments, a constraint is imposed to prevent this—namely any less compressed type can always represent all values of a more compressed type.

But even this constraint is not enough to guarantee no cracking. This is because the displacement values the decompressor will recover from the lowermost sub triangles on the edge shared with the uppermost sub triangle are not the original displacements of the mesh, but rather have passed through a lossy compression process. Accordingly, in one embodiment, we place bit-for-bit matching above precision, and propagate the successfully compressed then recovered values from the lower sub triangle vertices onto the shared edge with the uppermost sub triangle, thereby substituting the propagated values for the uppermost sub triangle's own vertex displacements. By propagating these displacement values recovered from decompressing the lower sub triangle vertex to the less-compressed uppermost sub triangle—and with the constraint that the less compressed format of the uppermost sub triangle can exactly represent those propagated values from a more compressed format—it can now be guaranteed that the vertex displacements the decoder recovers for the uppermost sub triangle will be bit-for-bit identical with the corresponding vertex displacements the decoder will recover for the lowermost sub triangles along the shared edge—with no requirement that the decoder decodes both at the same time or knows there is a shared edge.

Figure 23D:
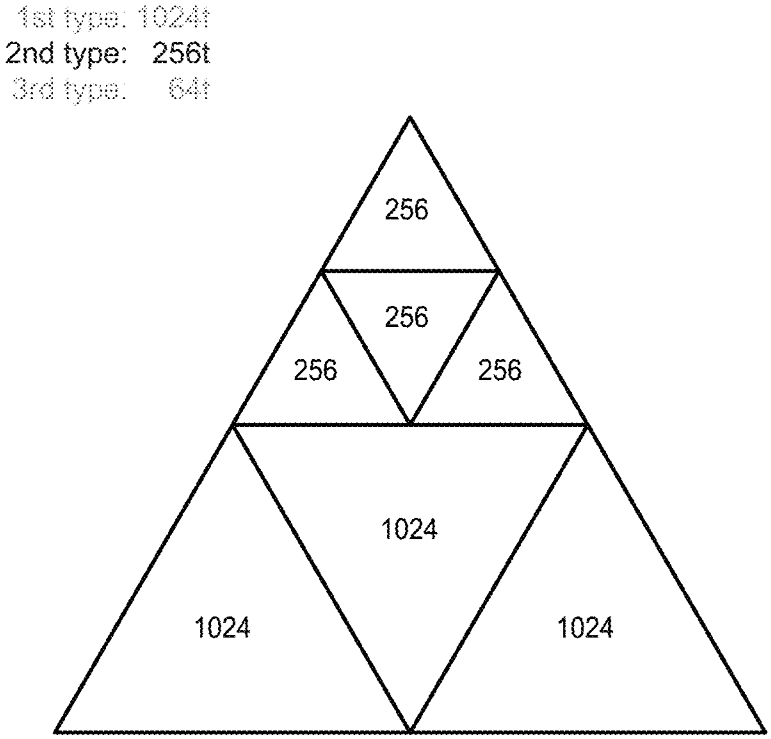

The algorithm will then try to recompress the four subdivided upper sub triangles as shown in FIG. 23D using the propagated values as described above. Now suppose as shown in FIG. 23E that all but the middle triangle are found to have acceptable quality but that the middle triangle must be recompressed with a still lower tessellation rate.

Figure 23E:
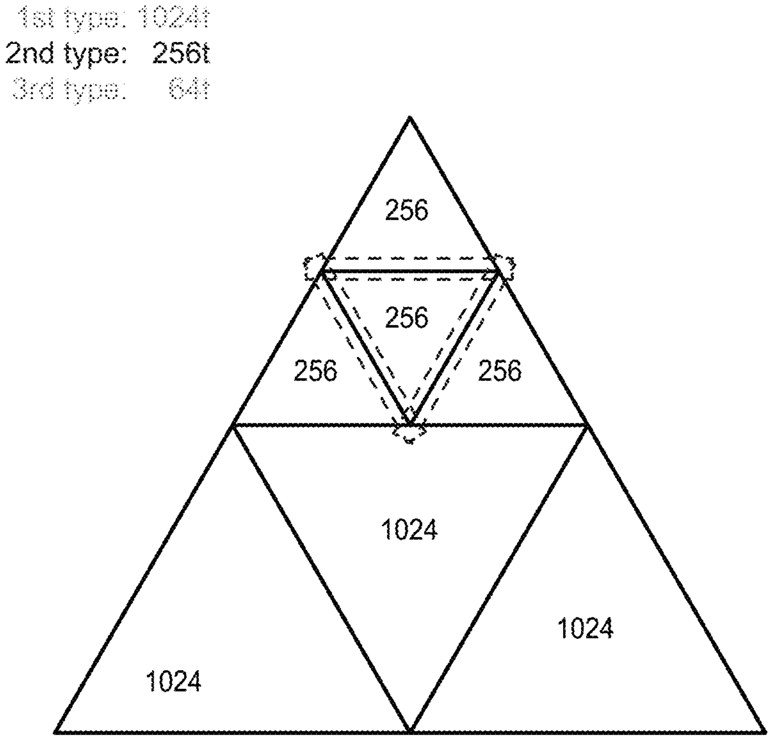
Figure 23F:
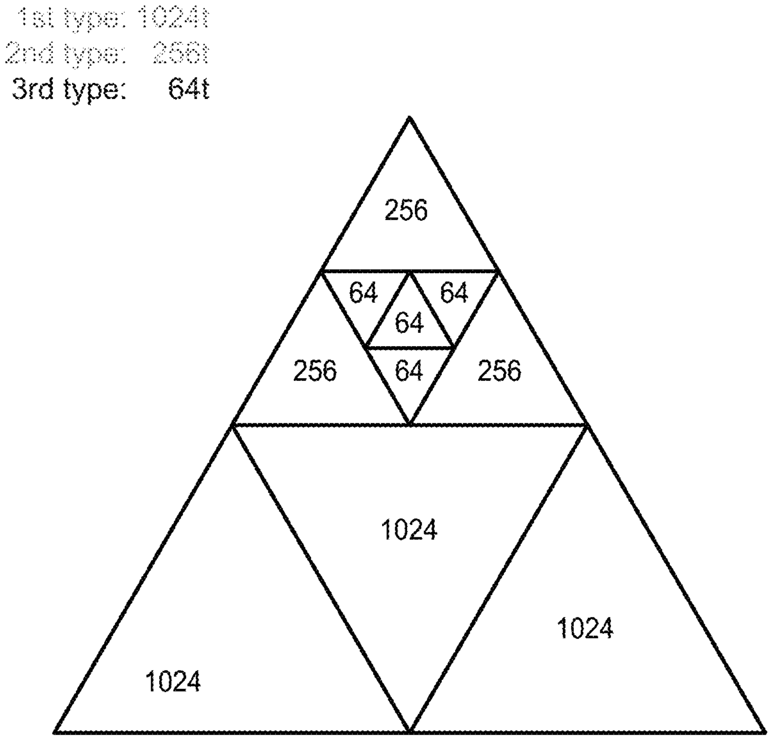

As FIG. 23E shows, all three edges of the middle triangle are shared with other sub triangles. In this case, recovered displacements for all of the vertices of the middle sub triangle will be propagated from the already-compressed surrounding sub triangles to ensure there is bit-for-bit matching with vertices on shared edges. FIG. 23F shows that the middle triangle is further subdivided into level 3 sub triangles that may not be compressed at all but rather may simple set forth the decompressed displacement values from the shared edges in uncompressed form.

Compressor—Mesh Encoder (Adaptive)

As shown below encoding of adaptively tessellated meshes uses an additional outer loop, in order to process sub triangles in ascending tessellation rate order:

```
foreach base triangle resolution (from lower to higher
    res):
  foreach micromesh type (from most to least com-
      pressed):
    foreach not encoded triangle:
      encode sub triangle
      if successful then mark sub triangle as encoded
        foreach partially encoded edge:
  update reference displacements in not-yet-encoded sub
    triangles.
```

The example compression technique herein does not make any assumption of whether the mesh we are compressing is manifold or not, and therefore we can compress non-manifold meshes just fine. This property can be quite important (often assets from games are not manifold) and makes the example embodiment more robust.

Note that when updating the reference displacements for edges shared with sub triangles that use a 2× higher tessellation rate, only every other vertex is affected (see FIG. 20B), while in one embodiment the remaining vertices are forced to use zero corrections in order to match the displacement slope on the shared edge of the lower resolution sub triangle. Moreover, higher resolution sub triangles that "receive" updated displacement values from lower resolution sub triangles are not guaranteed to be able to represent such values. While these cases tend to be rare, to avoid cracks, the updated reference values may be forced to be encoded losslessly, in order to always match their counterpart on the edge of the lower resolution sub triangle. If such lossless encoding is not possible, the sub triangle fails to encode and a future attempt is made with a less compressed μ-mesh type.

Example Implementations

Figure 9:
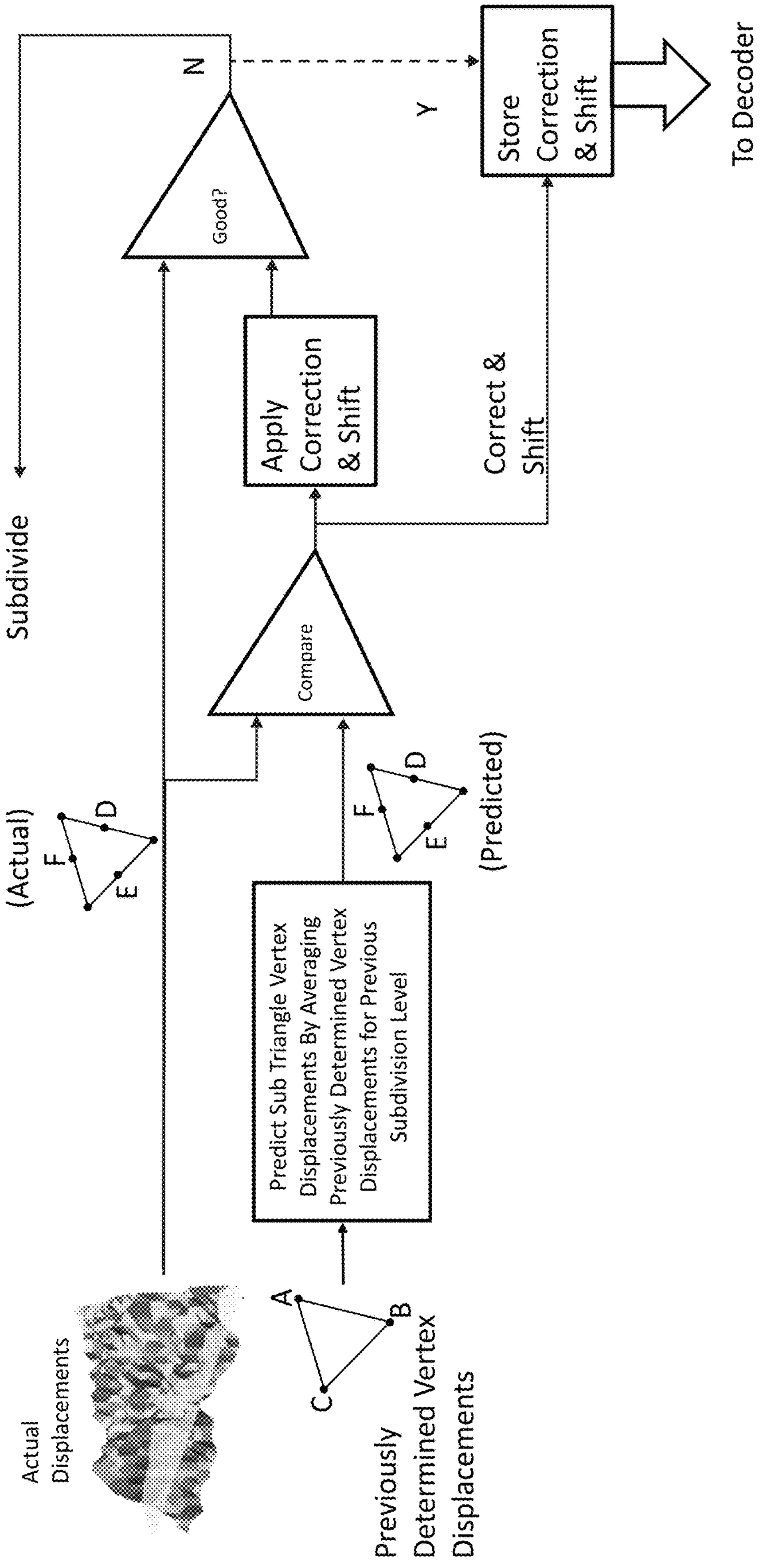
FIG. 9 shows an example encoder prediction and correction process.
Figure 10:
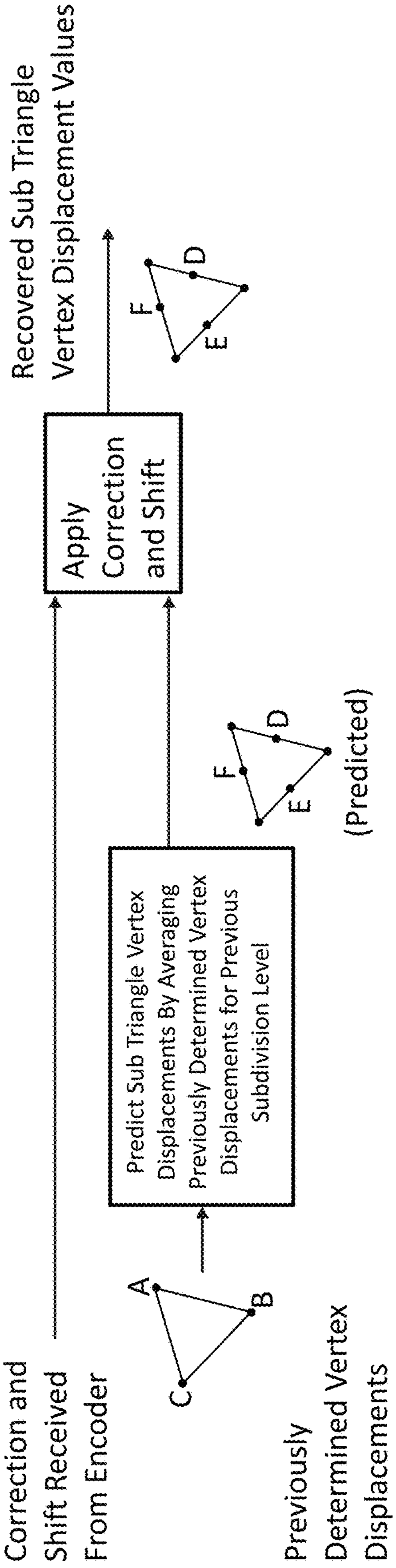
FIG. 10 shows an example decoder process.
Figure 10A:
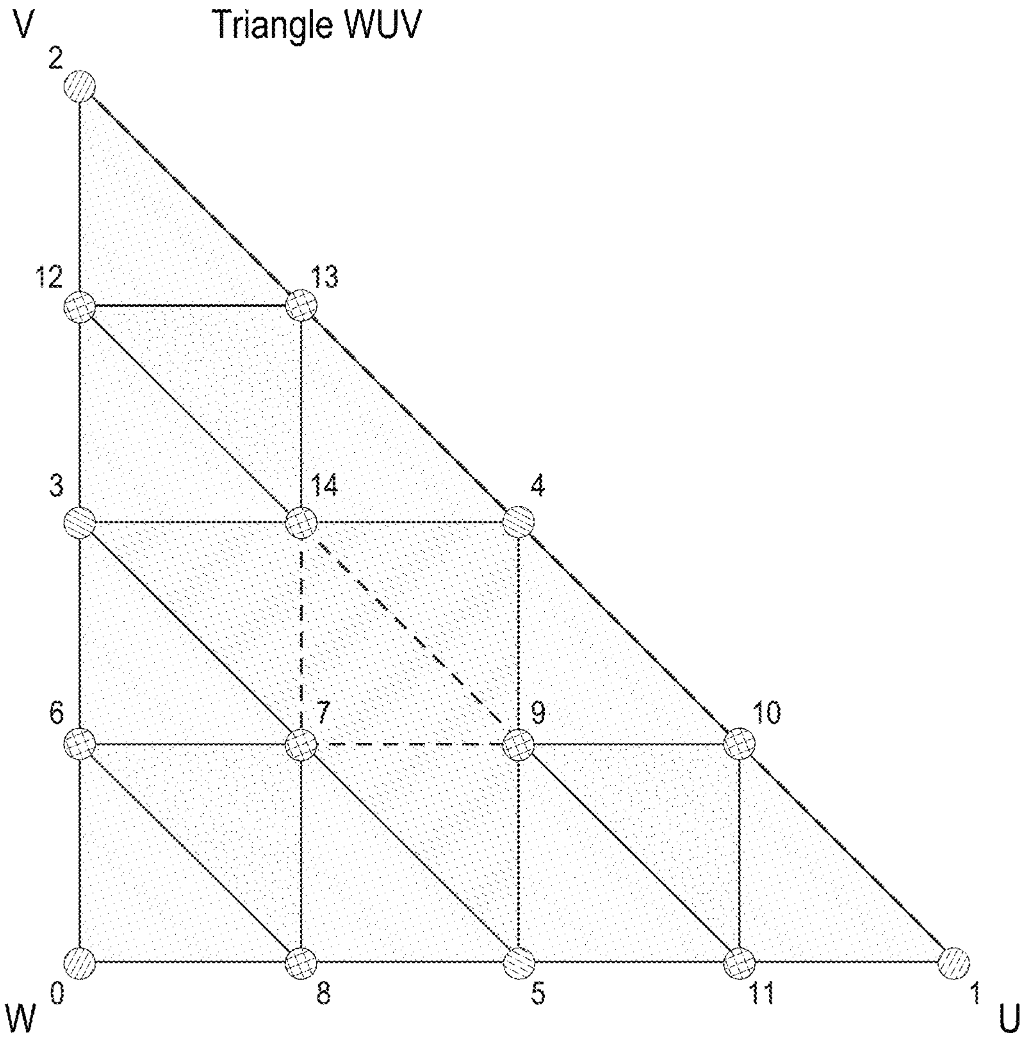
FIG. 10A shows an example subdivided sub triangle.
Figure 24:
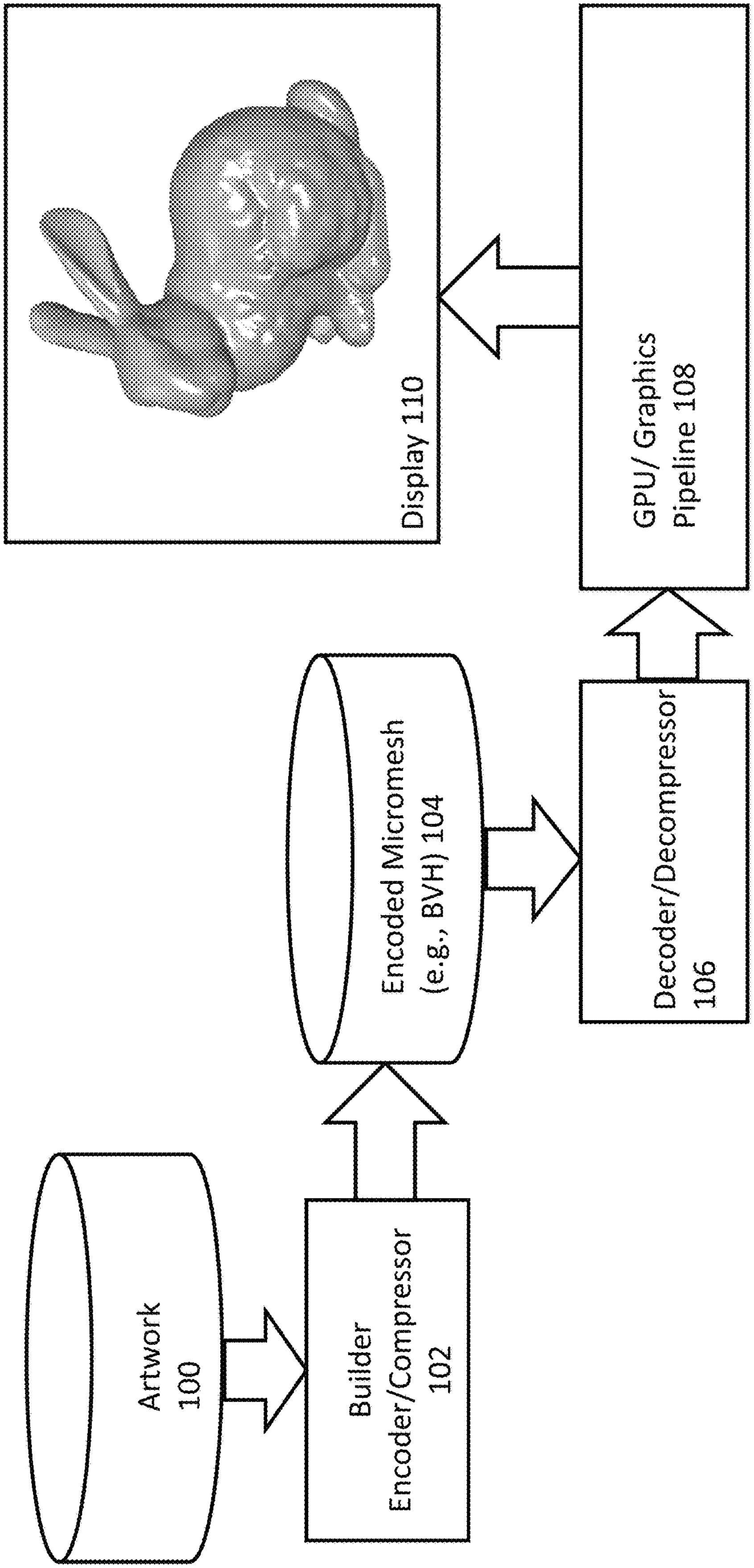
FIG. 24 shows an example system.

FIG. 24 shows an example system that implements the non-limiting technology herein. In the example shown, artwork 100 in an appropriate form is received by at least one processor executing the algorithms of the builder such as shown in FIGS. 9, 14 & 22 (block 102). The builder encodes/compresses the artwork into a mesh of micromeshes as discussed above, and stores the encoded micromesh in nontransitory memory as an acceleration data structure comprising a bounding volume hierarchy 104 including data format such as shown in FIGS. 6, 12 & 13. The encoded micromesh 104 is communicated (e.g., over a network, on a storage medium, etc.) to a decoder/decompressor 106. The decoder/decompressor 106 may comprise hardware circuits and/or at least one processor that performs/executes the algorithms discussed above in connection with FIG. 10 to recover the compressed displacement values and provide them to a GPU having a graphics pipeline 108 for rendering images on a display 110.

Figure 25A:
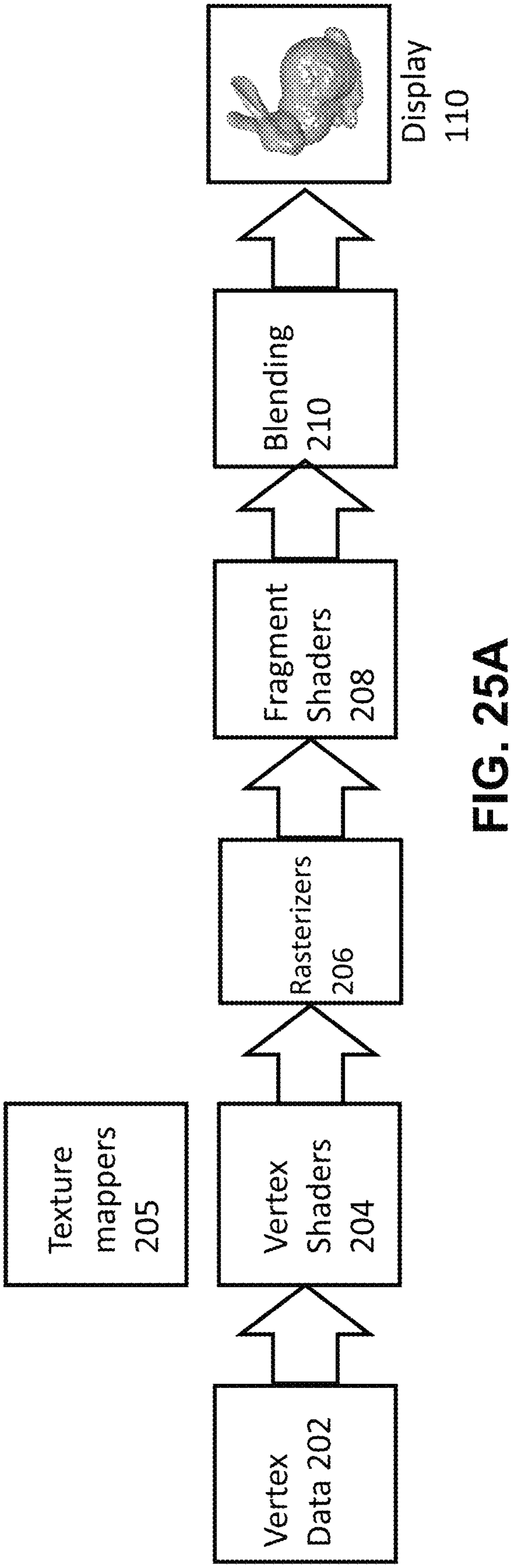
FIGS. 25A, 25B, 25C show different system configurations.

FIG. 25A shows the graphics pipeline may comprise vertex shaders 204 and texture mappers 205 that receive cacheline-sized vertex and displacement data blocks 202 from a cache memory via a memory interface circuit, and provide information to rasterizers 206 that in turn generate fragments using fragment shaders 208 that are blended to provide image display.

Figure 25B:
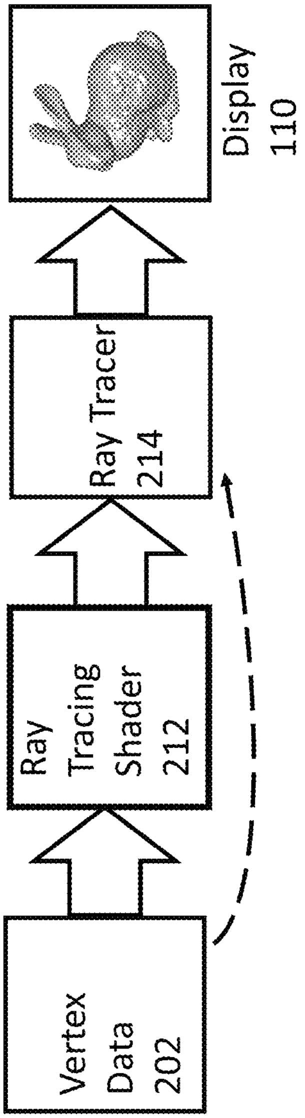
Figure 26:
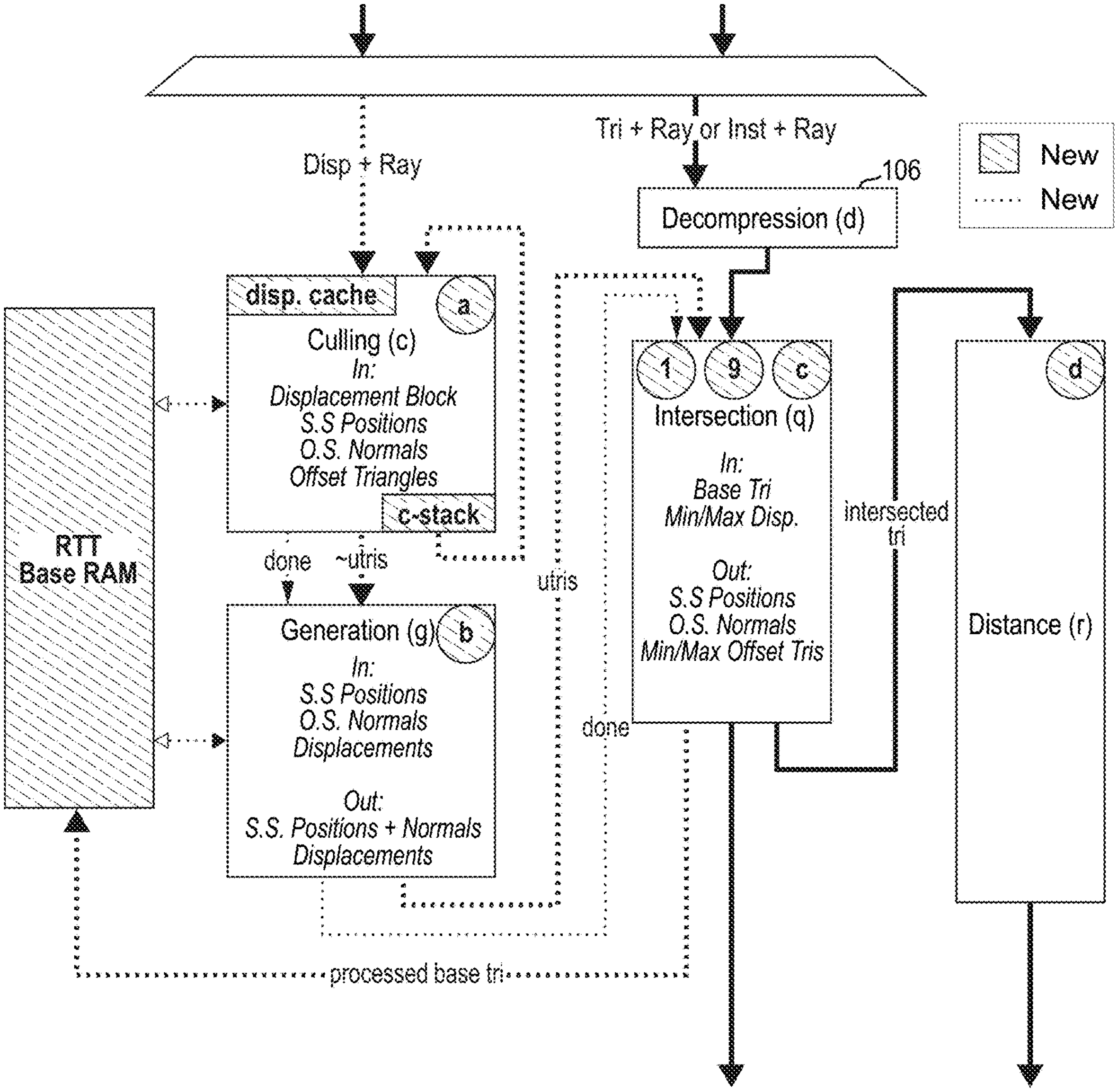
FIG. 26 shows an example ray tracer hardware implementation.

FIG. 25B shows an alternative graphics pipeline wherein the vertex data 202 is provided to a ray tracing shader 202 and also to ray tracing hardware 214 that use ray and path tracing to produce display 110. FIG. 26 shows an example block diagram of a portion of the ray tracing hardware 214 that includes the decompressor 106 that receives displacement blocks from the memory system and provides decompressed displacement values to an intersection test circuit for testing against rays.

Figure 25C:
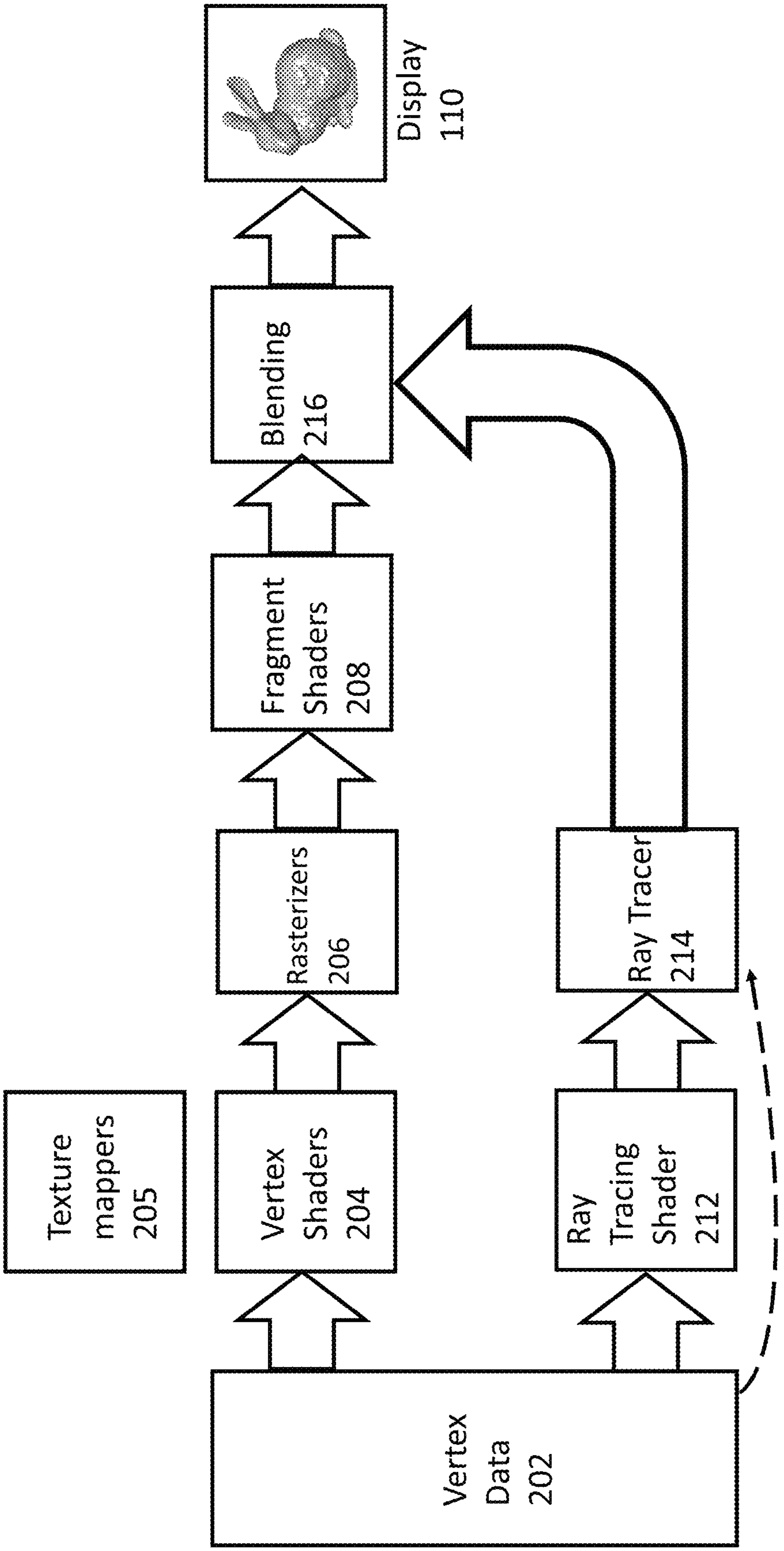

FIG. 25C shows a combined graphics pipeline that uses a blend of displaced micromesh-based outputs produced by vertex shaders 204, texture mappers 205, and ray tracer 214 to produce images.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Furthermore, images generated applying one or more of the techniques disclosed herein may be used to display or convey information about a virtual environment such as the metaverse, Omniverse, or a digital twin of a real environment. Furthermore, Images generated applying one or more of the techniques disclosed herein may be used to display or convey information on a variety of devices including a personal computer (e.g., a laptop), an Internet of Things (IoT) device, a handheld device (e.g., smartphone), a vehicle, a robot, or any device that includes a display.

All patents, patent applications and publications cited herein are incorporated by reference for all purposes as if expressly set forth.

All patents & publications cited above are incorporated by reference as if expressly set forth. While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. In a computing system including a memory system comprising a cache memory organized into plural cache lines each having a cacheline size, a graphics rendering system comprising:

a memory interface circuit that receives compressed cacheline-sized microvertex displacement blocks from the cache memory, each received compressed cacheline-sized microvertex displacement block being sized to fit displacement information for the microvertices of microtriangles encoded thereby into a respective single cache line of the cache memory;

a predictor circuit that predicts displacement values for the microvertices and corrects the predicted displacement values at least in part based on displacement information contents of the compressed cacheline-sized microvertex displacement blocks; and a graphics pipeline that renders an image based at least in part on the corrected, predicted displacement values.

2. The graphics rendering system of claim 1 wherein the compressed cacheline-sized microvertex displacement blocks are part of an acceleration structure and the graphics pipeline comprises a ray tracer.

3. The graphics rendering system of claim 2 wherein the ray tracer comprises a ray intersection test circuit that receives the corrected, predicted displacement values from the predictor circuit.

4. The graphics rendering system of claim 3 wherein the predictor circuit comprises a shift register that shifts correction values obtained from the compressed cacheline-sized microvertex displacement blocks based on shift amounts the compressed cacheline-sized microvertex displacement blocks specify.

5. The graphics rendering system of claim 1 wherein the graphics pipeline includes a triangular texture mapper.

6. The graphics rendering system of claim 1 wherein the predictor circuit provides bit-for-bit matches of corrected displacement values for vertices of different microtriangles the predictor circuit calculates at different times.

7. The graphics rendering system of claim 1 wherein the cacheline size is 128 bytes.

8. The graphics rendering system of claim 1 wherein the prediction circuit is configured to receive a set of base anchor displacements for a base triangle, and is further configured to predict, for each successive subdivision step to a next higher tessellation level in recursive subdivision, displacement amounts for interpolated intermediate microvertices by averaging displacement amounts of previously received and/or previously calculated adjacent microvertices.

9. The graphics rendering system of claim 1 wherein the prediction circuit is further configured to calculate a predicted displacement value from information already available to it, and then apply a delta correction supplied by the compressed microvertex displacement blocks to adjust the calculated predicted displacement value.

10. The graphics rendering system of claim 1 further including a scaling circuit that scales each predicted microvertex displacement value by applying a per-vertex scaling correction the compressed microvertex displacement blocks specify.

11. The graphics rendering system of claim 1 wherein the predictor circuit corrects the predicted displacement values with signed, variable-bit correction factors carried by the compressed microvertex displacement blocks.

12. A graphics processing method comprising:

receiving compressed microvertex displacement blocks from a cache memory organized into plural cache lines, each compressed microvertex displacement block being sized to fit displacement information for the microvertices of microtriangles encoded thereby into a respective single cache line of the cache memory;

predicting microvertex displacements at least in part based on contents of the compressed microvertex displacement blocks;

correcting the predicted microvertex displacements based on correction factors specified by the compressed microvertex displacement blocks; and rendering an image based at least in part on the corrected, predicted microvertex displacements.

13. The graphics processing method of claim 12 wherein rendering comprises rendering a crack free image.

14. The graphics processing method of claim 12 wherein the rendering comprises testing a ray for intersection with geometry specified by the corrected, predicted microvertex displacements.

15. The graphics processing method of claim 12 further including shifting the correction factors in response to shift values the compressed microvertex displacement blocks specify.

16. The graphics processing method of claim 12 further including encoding a mesh with the microvertex displacement blocks without making any assumption of whether the mesh is manifold or not.

17. The graphics processing method of claim 12 wherein the cache memory cache lines are each 128 bytes long.

18. The graphics processing method of claim 12 further including receiving a set of base anchor displacements for a base triangle, and predicting, for each successive subdivision to a next higher tessellation level in recursive subdivision, displacement amounts for interpolated intermediate microvertices by averaging displacement amounts of previously received or previously calculated adjacent microvertices.

19. The graphics processing method of claim 12 wherein predicting includes calculating a predicted displacement from information already available, and then applying a delta correction the compressed microvertex displacement blocks specify to adjust the calculated predicted displacement.

20. The graphics processing method of claim 12 further including scaling each predicted microvertex displacement by a per-microvertex scaling correction the compressed microvertex displacement blocks specify.

21. The graphics processing method of claim 12 wherein correcting comprises applying signed, variable-bit correction factors carried by the microvertex displacement blocks.

* * * * *